(12) United States Patent
Fu et al.

(10) Patent No.: US 11,314,043 B2
(45) Date of Patent: Apr. 26, 2022

(54) LENS ASSEMBLY INCLUDING SIX LENSES OF −−++−+ REFRACTIVE POWERS

(71) Applicants: Sintai Optical (Shenzhen) Co., Ltd., ShenZhen (CN); Asia Optical Co., Inc., Taichung (TW)

(72) Inventors: Tao Fu, ShenZhen (CN); Jian-Wei Lee, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 150 days.

(21) Appl. No.: 16/558,206

(22) Filed: Sep. 2, 2019

(65) Prior Publication Data

US 2020/0081223 A1    Mar. 12, 2020

(30) Foreign Application Priority Data

Sep. 10, 2018 (CN) .......................... 201811050755.7
May 13, 2019 (CN) .......................... 201910393492.8

(51) Int. Cl.
*G02B 13/00* (2006.01)
*G02B 9/62* (2006.01)

(52) U.S. Cl.
CPC ............ *G02B 9/62* (2013.01); *G02B 13/0045* (2013.01)

(58) Field of Classification Search
CPC ............................. G02B 9/62; G02B 13/0045
See application file for complete search history.

(56) References Cited

U.S. PATENT DOCUMENTS

| 9,103,962 B2 | 8/2015 | Liao et al. |
| 9,568,725 B2 | 2/2017 | Ushio |
| 9,599,797 B1* | 3/2017 | Liu .................. G02B 13/06 |
| 9,958,647 B2 | 5/2018 | Chen |
| 10,073,248 B2 | 9/2018 | Lin et al. |
| 10,203,485 B2 | 2/2019 | Chang et al. |
| 10,539,760 B2 | 1/2020 | Chen et al. |
| 2018/0356615 A1 | 12/2018 | Zhang et al. |
| 2019/0064483 A1* | 2/2019 | Chen .................. G02B 9/62 |

(Continued)

FOREIGN PATENT DOCUMENTS

| CN | 103676092 A | 3/2014 |
| CN | 203606551 U | 5/2014 |
| CN | 105044885 A * | 11/2015 |

(Continued)

*Primary Examiner* — Wen Huang
(74) *Attorney, Agent, or Firm* — McClure, Qualey & Rodack, LLP

(57) ABSTRACT

A lens assembly includes a first lens, a second lens, a third lens, a fourth lens, a fifth lens, and a sixth lens. The first lens is with negative refractive power. The second lens is with negative refractive power. The third and fourth lenses are with positive refractive power. The fifth lens is with negative refractive power. The sixth lens is with positive refractive power. The first lens, the second lens, the third lens, the fourth lens, the fifth lens, and the sixth lens are arranged in order from an object side to an image side along an optical axis. The lens assembly satisfies: $4.9 \leq TTL/f \leq 11.5$; wherein TTL is an interval from an object side surface of the first lens to an image plane along the optical axis and f is an effective focal length of the lens assembly.

8 Claims, 29 Drawing Sheets

(56) References Cited

U.S. PATENT DOCUMENTS

2019/0246016 A1\*  8/2019  Chang .................... H04N 5/33
2020/0200998 A1   6/2020  Wei et al.

FOREIGN PATENT DOCUMENTS

| | | |
|---|---|---|
| CN | 105044885 A | 11/2015 |
| CN | 106483630 A | 3/2017 |
| CN | 206557463 U | 10/2017 |
| CN | 206657134 U | 11/2017 |
| CN | 107741634 A | 2/2018 |
| CN | 108490584 A | 9/2018 |
| EP | 3187916 A1 | 7/2017 |
| JP | 2004177435 A | 6/2004 |
| JP | 2018136476 A | 8/2018 |
| TW | I449944 B | 8/2014 |
| TW | 201708875 A | 3/2017 |
| TW | I582483 B | 5/2017 |
| TW | I592694 B | 7/2017 |
| TW | 201727301 A | 8/2017 |
| TW | I632393 B | 8/2018 |
| TW | I642966 B | 12/2018 |
| TW | 201913164 A | 4/2019 |

\* cited by examiner

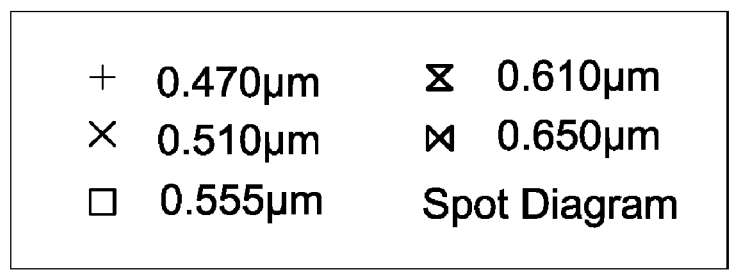
OBJ: 58.75Degrees
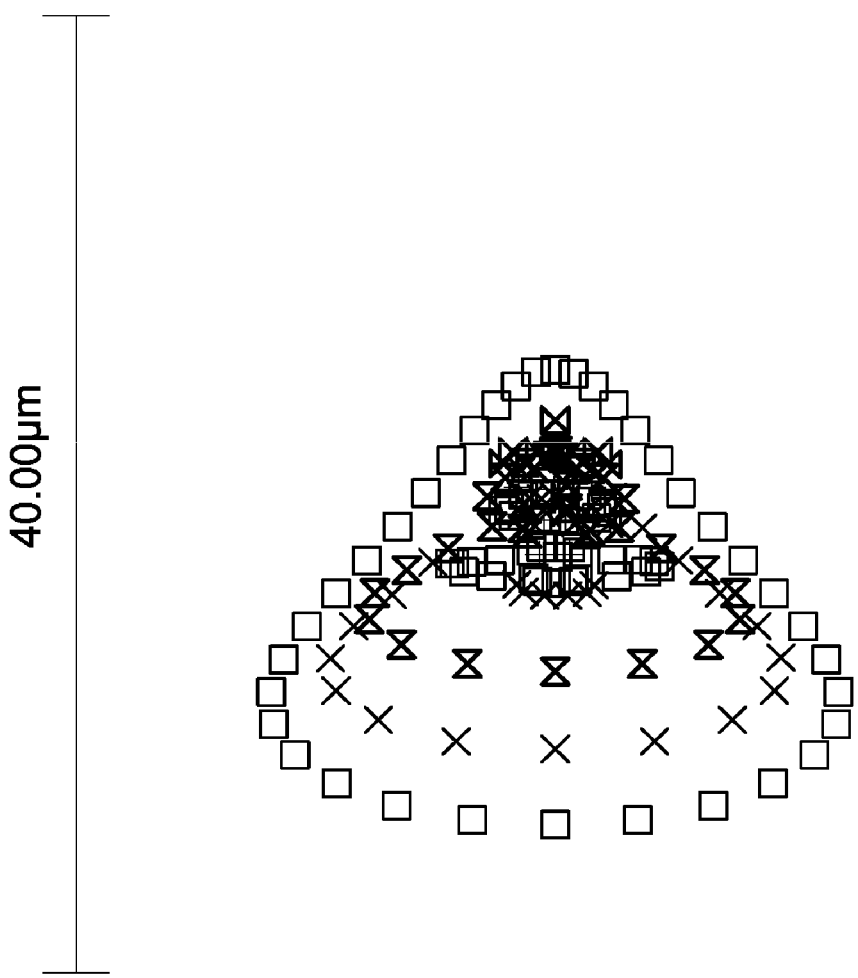
IMA: 2.330mm
RMS radius: 5.472μm
GEO radius: 15.410μm
Fig. 2E

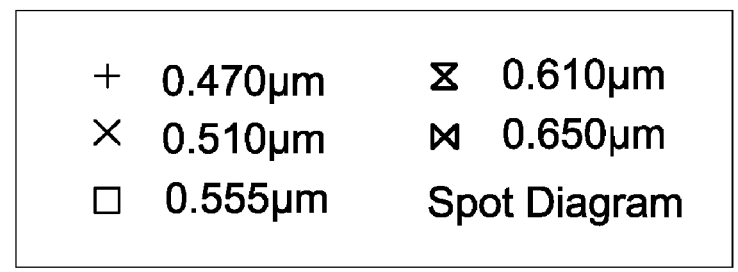
OBJ: 58.75Degrees
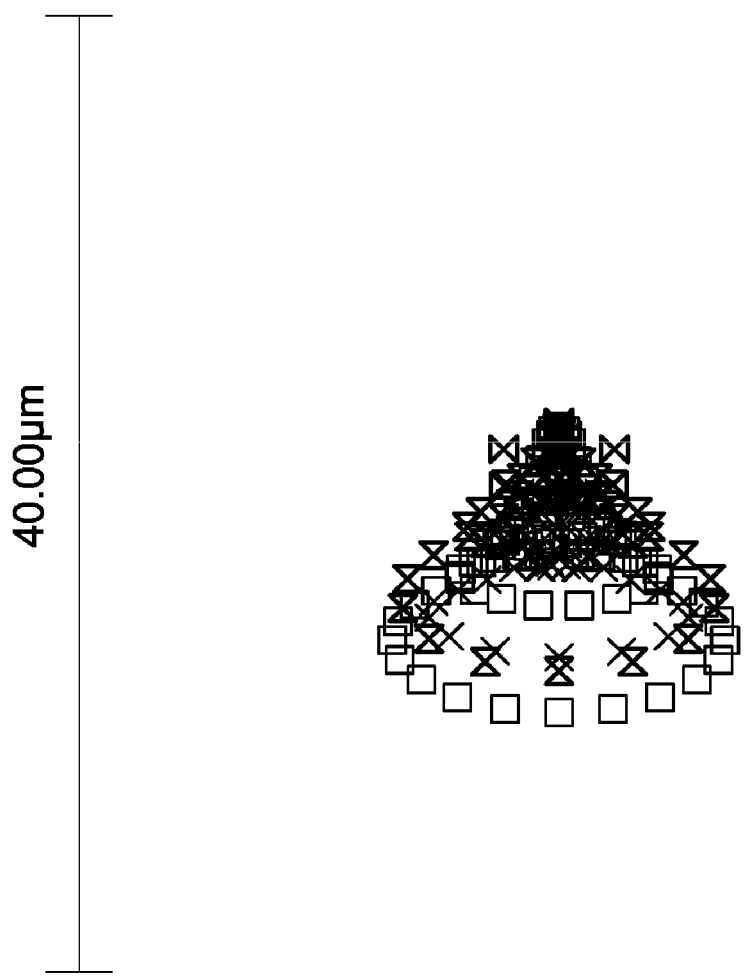
IMA: 2.349mm
RMS radius: 3.801μm
GEO radius: 9.647μm
Fig. 4E

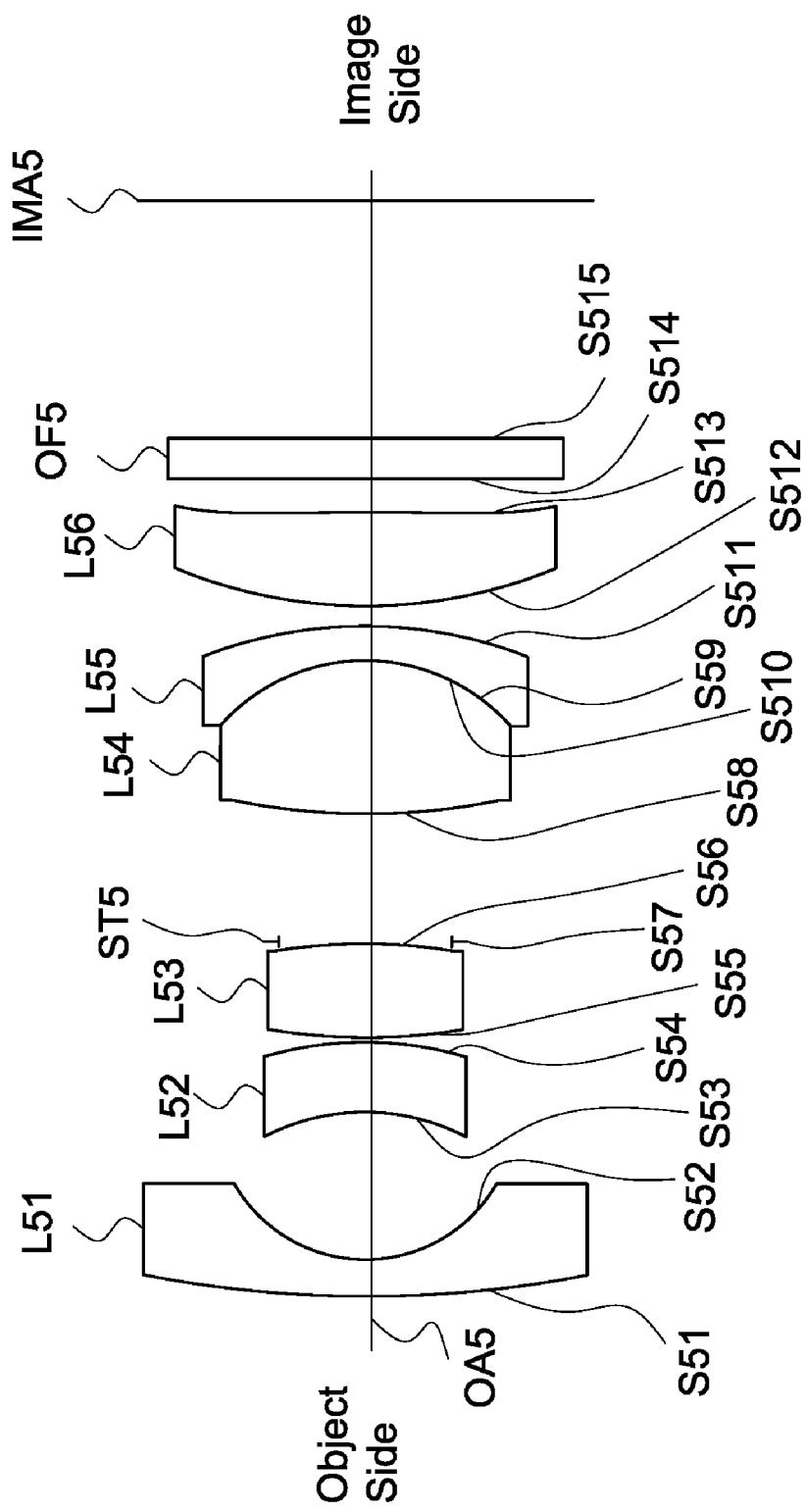

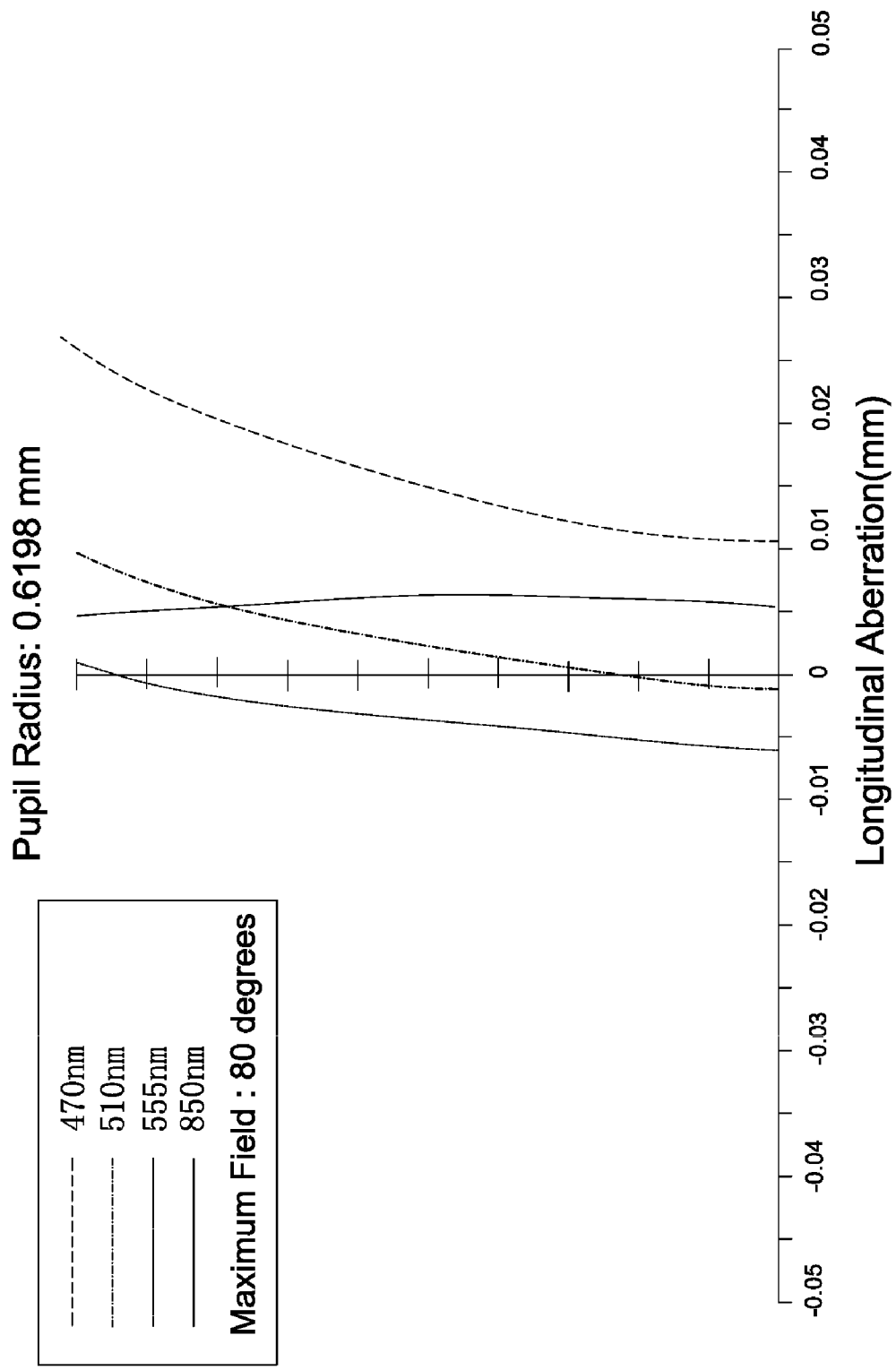

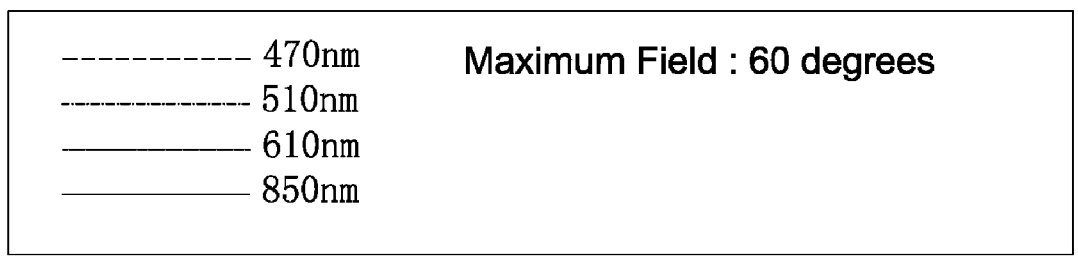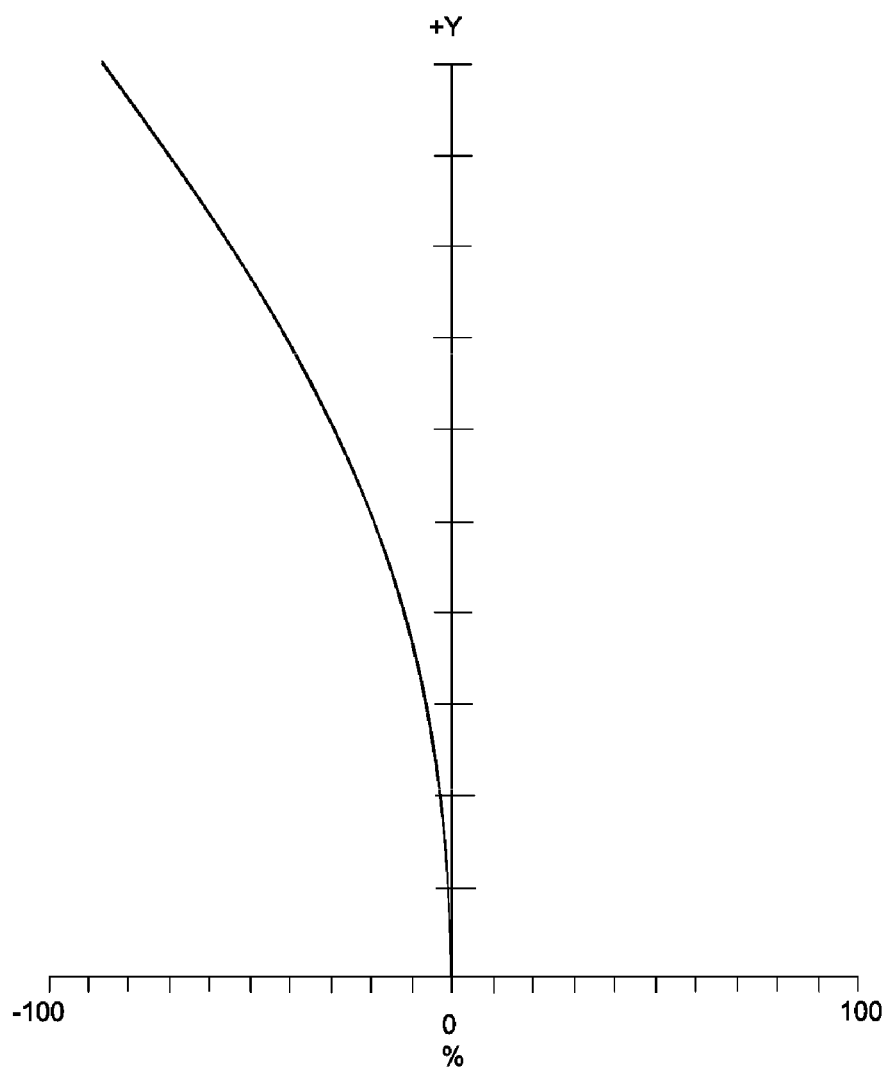
Fig. 9B

LENS ASSEMBLY INCLUDING SIX LENSES OF --++-+ REFRACTIVE POWERS

BACKGROUND OF THE INVENTION

Field of the Invention

The invention relates to a lens assembly.

Description of the Related Art

Today's lens assembly sometimes requires 8 to 10 pieces of lenses for lens design in order to reduce aberration to provide good optical performance, but the resulting total lens length is too long to meet the requirement of miniaturization. Therefore, the lens assembly needs a new structure in order to meet the requirement of miniaturization and provide good optical performance.

BRIEF SUMMARY OF THE INVENTION

The invention provides a lens assembly to solve the above problems. The lens assembly of the invention which requires only six lenses is provided with characteristics of a shortened total lens length and still has a good optical performance.

The lens assembly in accordance with an exemplary embodiment of the invention includes a first lens, a second lens, a third lens, a fourth lens, a fifth lens, and a sixth lens. The first lens is with negative refractive power. The second lens is with negative refractive power. The third and fourth lenses are with positive refractive power. The fifth lens is with negative refractive power. The sixth lens is with positive refractive power. The first lens, the second lens, the third lens, the fourth lens, the fifth lens, and the sixth lens are arranged in order from an object side to an image side along an optical axis. The lens assembly satisfies: $4.9 \leq TTL/f \leq 11.5$; wherein TTL is an interval from an object side surface of the first lens to an image plane along the optical axis and f is an effective focal length of the lens assembly.

In another exemplary embodiment, the lens assembly further includes a stop disposed between the third lens and the fourth lens, and the fourth lens and the fifth lens are cemented.

In yet another exemplary embodiment, the third lens includes a convex surface facing the object side and another convex surface facing the image side, the fourth lens includes a convex surface facing the object side and another convex surface facing the image side, the fifth lens includes a convex surface facing the image side, the sixth lens includes a convex surface facing the object side and another convex surface facing the image side, and the lens assembly satisfies: $0.12 \leq TTL/\theta_m \leq 0.37$; $30 \leq Vd_4 - Vd_5 \leq 50$; $-4 \leq f_2/f \leq -2$; $-3 \leq f_1/R_{12} \leq -0.5$; wherein TTL is an interval in mm from an object side surface of the first lens to an image plane along the optical axis, $\theta_m$ is a half maximum field of view in degree for the lens assembly, $Vd_4$ is an Abbe number of the fourth lens, $Vd_5$ is an Abbe number of the fifth lens, f is an effective focal length of the lens assembly, $f_2$ is an effective focal length of the second lens, $f_1$ is an effective focal length of the first lens, and $R_{12}$ is a radius of curvature of an image side surface of the first lens.

In another exemplary embodiment, the lens assembly satisfies: $2 \leq TTL/D_1 \leq 3.3$; wherein TTL is an interval in mm from an object side surface of the first lens to an image plane along the optical axis and $D_1$ is an effective diameter in mm for the first lens.

In yet another exemplary embodiment, the lens assembly satisfies: $1.8 \leq RS_{11}/f \leq 9.9$; wherein f is an effective focal length of the lens assembly and $RS_{11}$ is an effective radius of the first lens.

In another exemplary embodiment, the first lens includes a convex surface facing the object side and a concave surface facing the image side, the second lens includes a concave surface facing the object side, and the fifth lens includes a concave surface facing the object side.

In yet another exemplary embodiment, the lens assembly satisfies: $-4 < f_1/f < -0.8$; wherein f is an effective focal length of the lens assembly and $f_1$ is an effective focal length of the first lens.

In another exemplary embodiment, the lens assembly satisfies: $3.5 \leq f_6/f \leq 5.5$; wherein f is an effective focal length of the lens assembly and $f_6$ is an effective focal length of the sixth lens.

In yet another exemplary embodiment, the lens assembly satisfies: $-1.5 \leq f_{12}/f \leq 0.8$; $-1 \leq f_{12}/f_{3456} \leq -0.3$; wherein f is an effective focal length of the lens assembly, $f_{12}$ is an effective focal length of a combination of the first lens and the second lens, and $f_{3456}$ is an effective focal length of a combination of the third lens, the fourth lens, the fifth lens, and the sixth lens.

The lens assembly in accordance with another exemplary embodiment of the invention includes a first lens, a second lens, a third lens, a fourth lens, a fifth lens, and a sixth lens. The first lens is with negative refractive power. The second lens is with negative refractive power. The third and fourth lenses are with positive refractive power. The fifth lens is with negative refractive power. The sixth lens is with positive refractive power. The first lens, the second lens, the third lens, the fourth lens, the fifth lens, and the sixth lens are arranged in order from an object side to an image side along an optical axis. The lens assembly satisfies: $-4 < f_1/f < -0.8$; wherein f is an effective focal length of the lens assembly and $f_1$ is an effective focal length of the first lens.

In another exemplary embodiment, the lens assembly further includes a stop disposed between the third lens and the fourth lens, the fourth lens and the fifth lens are cemented, and the lens assembly satisfies: $0.12 \leq TTL/\theta_m \leq 0.37$; $30 \leq Vd_4 - Vd_5 \leq 50$; $-4 \leq f_2/f \leq -2$; $-3 \leq f_1/R_{12} \leq -0.5$; wherein TTL is an interval in mm from an object side surface of the first lens to an image plane along the optical axis, $\theta_m$ is a half maximum field of view in degree for the lens assembly, $Vd_4$ is an Abbe number of the fourth lens, $Vd_5$ is an Abbe number of the fifth lens, f is an effective focal length of the lens assembly, $f_2$ is an effective focal length of the second lens, $f_1$ is an effective focal length of the first lens, and $R_{12}$ is a radius of curvature of an image side surface of the first lens.

In yet another exemplary embodiment, the third lens includes a convex surface facing the object side and another convex surface facing the image side, the fourth lens includes a convex surface facing the object side and another convex surface facing the image side, the fifth lens includes a concave surface facing the object side, and the sixth lens includes a convex surface facing the object side and another convex surface facing the image side.

In another exemplary embodiment, the lens assembly satisfies: $2 \leq TTL/D_1 \leq 3.3$; wherein TTL is an interval in mm from an object side surface of the first lens to an image plane along the optical axis and $D_1$ is an effective diameter in mm for the first lens.

In yet another exemplary embodiment, the lens assembly satisfies: $1.8 \leq RS_{11}/f \leq 9.9$; wherein f is an effective focal length of the lens assembly and $RS_{11}$ is an effective radius of the first lens.

In another exemplary embodiment, the first lens includes a convex surface facing the object side and a concave surface facing the image side, the second lens includes a concave surface facing the object side, and the fifth lens includes a concave surface facing the object side.

In yet another exemplary embodiment, the lens assembly satisfies: $0.2 \leq TTL/\theta \leq 0.43$; wherein TTL is an interval in mm from an object side surface of the first lens to an image plane along the optical axis and $\theta$ is a half field of view in degree for the lens assembly.

In another exemplary embodiment, the lens assembly satisfies: $3.5 \leq f_6/f \leq 5.5$; wherein f is an effective focal length of the lens assembly and $f_6$ is an effective focal length of the sixth lens.

In yet another exemplary embodiment, the lens assembly satisfies: $-1.5 \leq f_{12}/f \leq 0.8$; $-1 \leq f_{12}/f_{3456} \leq -0.3$; wherein f is an effective focal length of the lens assembly, $f_{12}$ is an effective focal length of a combination of the first lens and the second lens, and $f_{3456}$ is an effective focal length of a combination of the third lens, the fourth lens, the fifth lens, and the sixth lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 2E is a spot diagram of the lens assembly in accordance with the first embodiment of the invention;

FIG. 4E is a spot diagram of the lens assembly in accordance with the third embodiment of the invention;

FIG. 6 is a lens layout diagram of a lens assembly in accordance with a fifth embodiment of the invention;

FIG. 7C is a longitudinal aberration diagram of the lens assembly in accordance with the fifth embodiment of the invention;

FIG. 9B is a distortion diagram of the lens assembly in accordance with the sixth embodiment of the invention.

DETAILED DESCRIPTION OF THE INVENTION

The following description is made for the purpose of illustrating the general principles of the invention and should not be taken in a limiting sense. The scope of the invention is best determined by reference to the appended claims.

The present invention provides a lens assembly including a first lens, a second lens, a third lens, a fourth lens, a fifth lens, and a sixth lens, all of which are arranged in order from an object side to an image side along an optical axis. The first lens is with negative refractive power. The second lens is with negative refractive power. The third lens is with positive refractive power. The fourth lens is with positive refractive power. The fifth lens is with negative refractive power. The sixth lens is with positive refractive power. The lens assembly satisfies: $4.9 \leq TTL/f \leq 11.5$; wherein TTL is an interval from an object side surface of the first lens to an image plane along the optical axis and f is an effective focal length of the lens assembly.

The present invention provides another lens assembly including a first lens, a second lens, a third lens, a fourth lens, a fifth lens, and a sixth lens, all of which are arranged in order from an object side to an image side along an optical axis. The first lens is with negative refractive power. The second lens is with negative refractive power. The third lens is with positive refractive power. The fourth lens is with positive refractive power. The fifth lens is with negative refractive power. The sixth lens is with positive refractive power. The lens assembly satisfies: $-4 < f_1/f < -0.8$; wherein f is an effective focal length of the lens assembly and $f_1$ is an effective focal length of the first lens.

Referring to Table 1, Table 3, Table 5, Table 7, Table 9, and Table 12, wherein Table 1, Table 3, Table 5, Table 7, Table 9, and Table 12 show optical specifications in accordance with a first, second, third, fourth, fifth, and sixth embodiments of the invention respectively.

Figure 1:
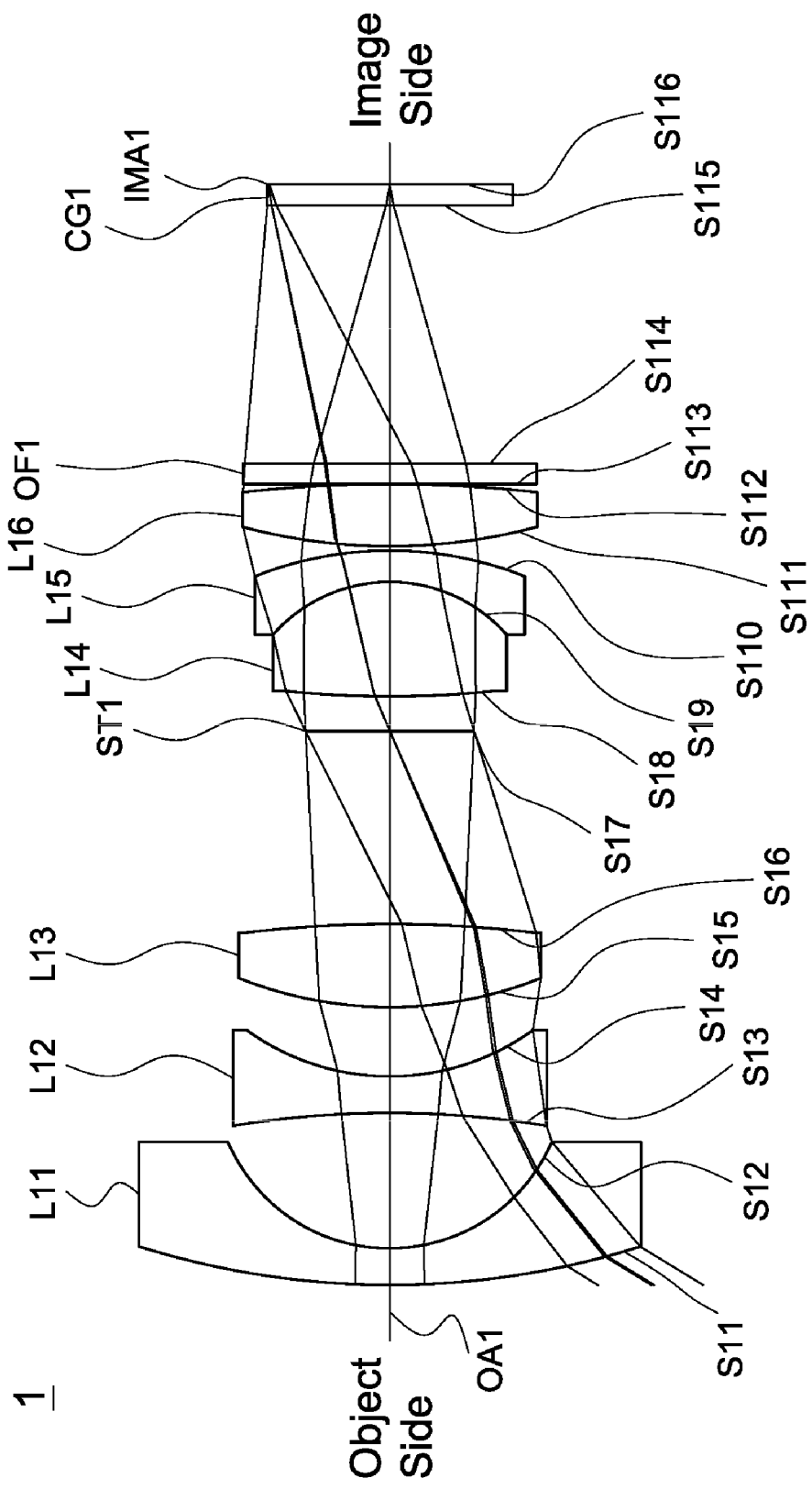
FIG. 1 is a lens layout and optical path diagram of a lens assembly in accordance with a first embodiment of the invention.

FIG. 1 is a lens layout and optical path diagram of the lens assembly in accordance with the first embodiment of the invention. The figures which depict the lens layout diagram of the lens assembly in accordance with the second, third, and fourth embodiments of the invention approximate to the figure which depicts the lens layout diagram of the lens assembly in accordance with the first embodiment of the invention. Therefore, the second, third, and fourth embodiments will use the same element symbols as the first embodiment and the figures which depict the lens layout diagram of the lens assembly in accordance with the second, third, and fourth embodiments of the invention are omitted.

The first lens L11, L21, L31, L41 are with negative refractive power and made of glass material, wherein the object side surfaces S11, S21, S31, S41 are convex surfaces, the image side surfaces S12, S22, S32, S42 are concave surfaces, and all of the object side surfaces S11, S21, S31, S41 and the image side surfaces S12, S22, S32, S42 are spherical surfaces.

The second lens L12, L22, L32, L42 are with negative refractive power and made of glass material, wherein the object side surfaces S13, S23, S33, S43 are concave surfaces, the image side surfaces S14, S24, S34, S44 are concave surfaces, and all of the object side surfaces S13, S23, S33, S43 and the image side surfaces S14, S24, S34, S44 are spherical surfaces.

The third lens L13, L23, L33, L43 are with positive refractive power and made of glass material, wherein all of the object side surfaces S15, S25, S35, S45 and the image side surfaces S16, S26, S36, S46 are spherical surfaces.

The fourth lens L14, L24, L34, L44 are with positive refractive power and made of glass material, wherein all of the object side surfaces S18, S28, S38, S48 and the image side surfaces S19, S29, S39, S49 are spherical surfaces.

The fifth lens L15, L25, L35, L45 are with negative refractive power and made of glass material, wherein the image side surfaces S110, S210, S310, S410 are convex surfaces, and all of the object side surfaces S19, S29, S39, S49 and the image side surfaces S110, S210, S310, S410 are spherical surfaces.

The sixth lens L16, L26, L36, L46 are with refractive power and made of glass material, wherein all of the object side surfaces S111, S211, S311, S411 and the image side surfaces S112, S212, S312, S412 are spherical surfaces.

The fourth lens L14, L24, L34, L44 and the fifth lens L15, L25, L35, L45 are cemented respectively in order to correct chromatic aberration.

In addition, the lens assembly 1, 2, 3, 4, 5, 6 satisfy at least one of the following conditions:

$$4.9 \leq TTL/f \leq 11.5; \quad (1)$$

$$0.2 \leq TTL/\theta \leq 0.43; \quad (2)$$

$$0.12 \leq TTL/\theta_m \leq 0.37; \quad (3)$$

$$2 \leq TTL/D_1 \leq 3.3; \quad (4)$$

$$-3 \leq f_1/R_{12} \leq -0.5; \quad (5)$$

$$1.8 \leq RS_{11}/f \leq 9.9; \quad (6)$$

$$30 \leq Vd_4 - Vd_5 \leq 50; \quad (7)$$

$$-4 < f_1/f < -0.8; \quad (8)$$

$$-4 < f_2/f < -2; \quad (9)$$

$$3.5 \leq f_6/f \leq 5.5; \quad (10)$$

$$-1.5 \leq f_{12}/f \leq 0.8; \quad (11)$$

$$-1 \leq f_{12}/f_{3456} \leq -0.3; \quad (12)$$

$$-1.5 < f_1/f < -0.8; \quad (13)$$

$$-4.5 < f_2/f < -3.5; \quad (14)$$

$$-1.5 < f_{12}/f < -0.8; \quad (15)$$

$$4.0 < f_6/f < 5.0; \quad (16)$$

$$-1 < f_{12}/f_{3456} < -0.5; \quad (17)$$

$$2.2 < TTL/D_1 < 2.6; \quad (18)$$

wherein f is an effective focal length of the lens assembly 1, 2, 3, 4, 5, 6 for the first to sixth embodiments, $f_1$ is an effective focal length of the first lens L11, L21, L31, L41, L51, L61 for the first to sixth embodiments, $f_2$ is an effective focal length of the second lens L12, L22, L32, L42, L52, L62 for the first to sixth embodiments, $f_6$ is an effective focal length of the sixth lens L16, L26, L36, L46, L56, L66 for the first to sixth embodiments, TTL is an interval in mm from the object side surface S11, S21, S31, S41, S51, S61 of the first lens L11, L21, L31, L41, L51, L61 to an image plane IMA1, IMA2, IMA3, IMA4, IMA5, IMA6 along the optical axis OA1, OA2, OA3, OA4, OA5, OA6 for the first to sixth embodiments, θ is a half field of view in degree of the lens assembly 1, 2, 3, 4, 5, 6 for the first to sixth embodiments, $\theta_m$ is a half maximum field of view in degree of the lens assembly 1, 2, 3, 4, 5, 6 for the first to sixth embodiments, $D_1$ is an effective diameter in mm of the first lens L11, L21, L31, L41, L51, L61 for the first to sixth embodiments, $R_{12}$ is a radius of curvature of the image side surface S12, S22, S32, S42, S52, S62 of the first lens L11, L21, L31, L41, L51, L61 for the first to sixth embodiments, $RS_{11}$ is an effective radius of the first lens L11, L21, L31, L41, L51, L61 for the first to sixth embodiments, $Vd_4$ is an Abbe number of the fourth lens L14, L24, L34, L44, L54, L64 for the first to sixth embodiments, $Vd_5$ is an Abbe number of the fifth lens L15, L25, L35, L45, L55, L65 for the first to sixth embodiments, $f_{12}$ is an effective focal length of a combination of the first lens L11, L21, L31, L41, L51, L61 and the second lens L12, L22, L32, L42, L52, L62 for the first to sixth embodiments, and $f_{3456}$ is an effective focal length of a combination of the third lens L13, L23, L33, L43, L53, L63, the fourth lens L14, L24, L34, L44, L54, L64, the fifth lens L15, L25, L35, L45, L55, L65, and the sixth lens L16, L26, L36, L46, L56, L66 for the first to sixth embodiments. Making the lens assembly 1, 2, 3, 4, 5, 6 can effectively shorten the total lens length, effectively correct aberration, and effectively correct chromatic aberration.

A detailed description of a lens assembly in accordance with a first embodiment of the invention is as follows. Referring to FIG. 1, the lens assembly 1 includes a first lens L11, a second lens L12, a third lens L13, a stop ST1, a fourth lens L14, a fifth lens L15, a sixth lens L16, an optical filter OF1, and a cover glass CG1, all of which are arranged in order from an object side to an image side along an optical axis OA1. In operation, an image of light rays from the object side is formed at an image plane IMA1.

According to paragraphs [0054]-[0064], the first lens L11 is a meniscus lens; the second lens L12 is a biconcave lens; the third lens L13 is a biconvex lens, wherein the object side surface S15 is a convex surface and the image side surface S16 is a convex surface; the fourth lens L14 is a biconvex surface, wherein the object side surface S18 is a convex surface and the image side surface S19 is a convex surface; the fifth lens L15 is meniscus lens, wherein the object side surface S19 is a concave surface; the sixth lens L16 is a biconvex lens with positive refractive power, wherein the object side surface S111 is a convex surface and the image side surface S112 is a convex surface; the fourth lens L14 and the fifth lens L15 are cemented; both of the object side surface S113 and image side surface S114 of the optical filter OF1 are plane surfaces; and both of the object side surface S115 and image side surface S116 of the cover glass CG1 are plane surfaces.

With the above design of the lenses and stop ST1 and at least any one of the conditions (1)-(12) satisfied, the lens assembly 1 can have an effective shortened total lens length and is capable of an effective corrected aberration and an effective corrected chromatic aberration.

Table 1 shows the optical specification of the lens assembly 1 in FIG. 1 wherein the effective focal length is equal to 2.469 mm, F-number is equal to 1.85, total lens length is equal to 21.1 mm, and field of view is equal to 105.8 degrees.

TABLE 1

| Surface Number | Radius of Curvature (mm) | Thickness (mm) | Nd | Vd | Effective Focal Length (mm) | Remark |
|---|---|---|---|---|---|---|
| S11 | 16.11 | 0.70 | 1.70 | 56.4 | −6.30 | The First Lens L11 |
| S12 | 3.40 | 2.60 | | | | |
| S13 | −18.50 | 0.70 | 1.52 | 64.2 | −7.17 | The Second Lens L12 |
| S14 | 4.71 | 1.33 | | | | |
| S15 | 7.84 | 1.59 | 1.85 | 32.2 | 7.09 | The Third Lens L13 |
| S16 | −24.23 | 3.70 | | | | |
| S17 | ∞ | 0.67 | | | | Stop ST1 |
| S18 | 20.35 | 2.19 | 1.70 | 55.4 | 3.89 | The Fourth Lens L14 |
| S19 | −3.00 | 0.60 | 1.92 | 20.9 | −6.02 | The Fifth Lens L15 |
| S110 | −7.08 | 0.09 | | | | |
| S111 | 11.06 | 1.19 | 1.84 | 43.1 | 9.35 | The Sixth Lens L16 |
| S112 | −25.60 | 0.00 | | | | |
| S113 | ∞ | 0.40 | 1.52 | 54.8 | | Optical Filter OF1 |
| S114 | ∞ | 4.94 | | | | |
| S115 | ∞ | 0.40 | 1.52 | 54.8 | | Cover Glass CG1 |

Table 2 shows the parameters and condition values for conditions (1)-(12) in accordance with the first embodiment of the invention. It can be seen from Table 2 that the lens assembly 1 of the first embodiment satisfies the conditions (1)-(12).

TABLE 2

| θ | 52.9 | $θ_m$ | 58.75 | $R_{12}$ | 3.4 |
|---|---|---|---|---|---|
| $RS_{11}$ | 4.825 | $f_{12}$ | −2.77 | $f_{3456}$ | 6.62 |
| $D_1$ | 9.65 | | | | |

TABLE 2-continued

| TTL/f | 8.55 | TTL/θ | 0.399 | $TTL/θ_m$ | 0.36 |
|---|---|---|---|---|---|
| $TTL/D_1$ | 2.19 | $f_1/R_{12}$ | −1.85 | $RS_{11}/f$ | 1.95 |
| $Vd_4 − Vd_5$ | 34.5 | $f_1/f$ | −2.55 | $f_2/f$ | −2.90 |
| $f_6/f$ | 3.79 | $f_{12}/f$ | −1.12 | $f_{12}/f_{3456}$ | −0.42 |

Figure 2A:
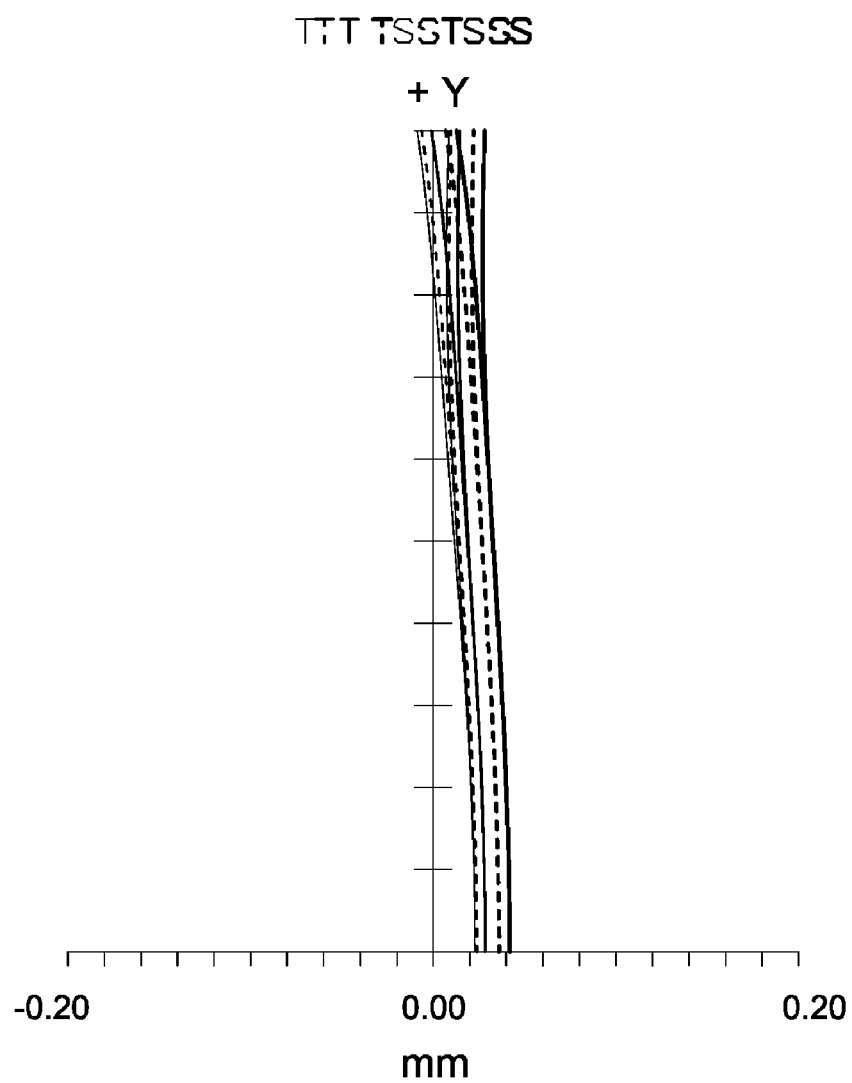
FIG. 2A depicts a field curvature diagram of the lens assembly in accordance with the first embodiment of the invention.

It can be seen from FIG. 2A that the field curvature of tangential direction and sagittal direction in the lens assembly 1 of the first embodiment ranges from −0.01 mm to 0.05 mm.

Figure 2B:
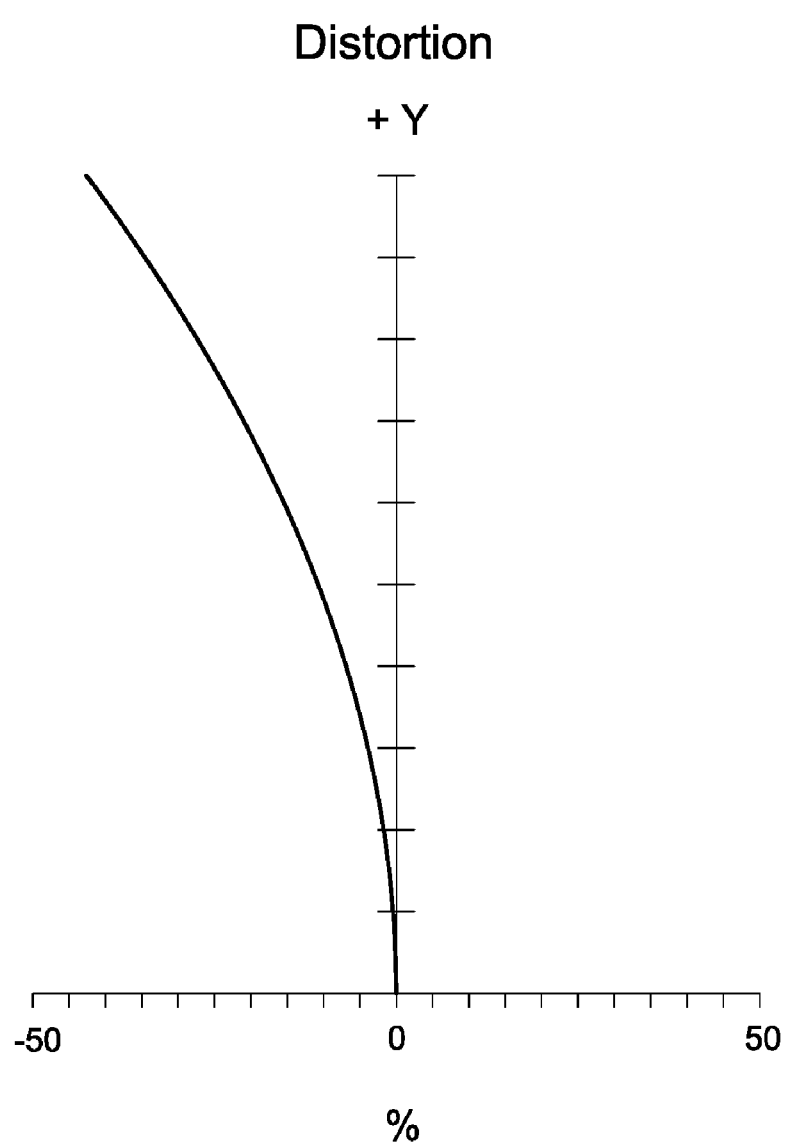
FIG. 2B is a distortion diagram of the lens assembly in accordance with the first embodiment of the invention.

It can be seen from FIG. 2B that the distortion in the lens assembly 1 of the first embodiment ranges from −45% to 0%.

Figure 2C:
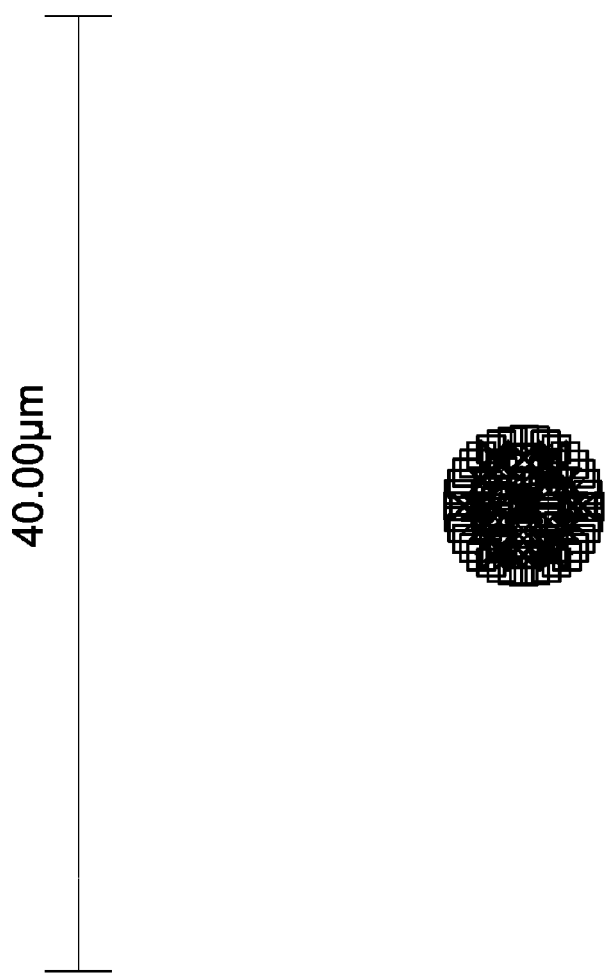
FIG. 2C is a spot diagram of the lens assembly in accordance with the first embodiment of the invention.

It can be seen from FIG. 2C that the root mean square spot radius is equal to 1.543 μm and geometrical spot radius is equal to 2.747 μm in the lens assembly 1 of the first embodiment.

Figure 2D:
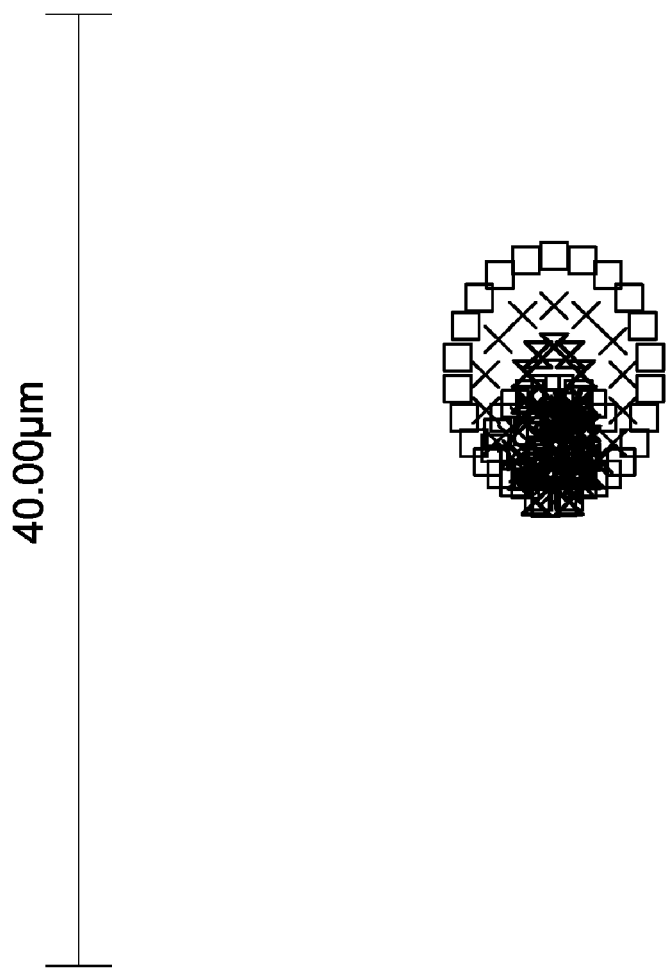
FIG. 2D is a spot diagram of the lens assembly in accordance with the first embodiment of the invention.

It can be seen from FIG. 2D that the root mean square spot radius is equal to 3.004 μm and geometrical spot radius is equal to 9.877 μm in the lens assembly 1 of the first embodiment.

It can be seen from FIG. 2E that the root mean square spot radius is equal to 5.472 μm and geometrical spot radius is equal to 15.410 μm in the lens assembly 1 of the first embodiment.

It is obvious that the field curvature and the distortion of the lens assembly 1 of the first embodiment can be corrected effectively. Therefore, the lens assembly 1 of the first embodiment is capable of good optical performance.

In the second embodiment of the lens assembly, the lens assembly 2 includes a first lens L21, a second lens L22, a third lens L23, a stop ST2, a fourth lens L24, a fifth lens L25, a sixth lens L26, an optical filter OF2, and a cover glass CG2, all of which are arranged in order from an object side to an image side along an optical axis OA2. In operation, an image of light rays from the object side is formed at an image plane IMA2.

According to paragraphs [0054]-[0064], the surface profiles of the first lens L21, the second lens L22, the third lens L23, the fourth lens L24, the fifth lens L25, and the sixth lens L26 approximate to that of the lens assembly 1 of the first embodiment, and is not described here again; the sign of the refractive power of the sixth lens L26 is the same as that of the sixth lens L16 in the first embodiment; the fourth lens L24 and the fifth lens L25 are cemented; both of the object side surface S213 and image side surface S214 of the optical filter OF2 are plane surfaces; and both of the object side surface S215 and image side surface S216 of the cover glass CG2 are plane surfaces.

With the above design of the lenses and stop ST2 and at least any one of the conditions (1)-(12) satisfied, the lens assembly 2 can have an effective shortened total lens length and is capable of an effective corrected aberration and an effective corrected chromatic aberration.

Table 3 shows the optical specification of the lens assembly 2 wherein the effective focal length is equal to 2.4517 mm, F-number is equal to 2.4, total lens length is equal to 21.08 mm, and field of view is equal to 105.8 degrees.

TABLE 3

| Surface Number | Radius of Curvature (mm) | Thickness (mm) | Nd | Vd | Effective Focal Length (mm) | Remark |
|---|---|---|---|---|---|---|
| S21 | 12.87 | 0.74 | 1.70 | 56.4 | −6.72 | The First Lens L21 |
| S22 | 3.36 | 2.98 | | | | |
| S23 | −15.42 | 0.73 | 1.52 | 64.2 | −6.76 | The Second Lens L22 |
| S24 | 4.61 | 1.32 | | | | |
| S25 | 7.96 | 1.46 | 1.85 | 32.2 | 6.99 | The Third Lens L23 |
| S26 | −21.91 | 3.48 | | | | |
| S27 | ∞ | 1.06 | | | | Stop ST2 |
| S28 | 19.23 | 1.78 | 1.70 | 55.4 | 3.84 | The Fourth Lens L24 |
| S29 | −3.00 | 0.60 | 1.92 | 20.9 | −6.07 | The Fifth Lens L25 |
| S210 | −7.01 | 0.11 | | | | |
| S211 | 9.95 | 1.08 | 1.84 | 43.1 | 9.81 | The Sixth Lens L26 |
| S212 | −45.25 | 0.00 | | | | |
| S213 | ∞ | 0.40 | 1.52 | 64.2 | | Optical Filter OF2 |
| S214 | ∞ | 4.94 | | | | |
| S215 | ∞ | 0.40 | 1.52 | 64.2 | | Cover Glass CG2 |

Table 4 shows the parameters and condition values for conditions (1)-(12) in accordance with the second embodiment of the invention. It can be seen from Table 4 that the lens assembly 2 of the second embodiment satisfies the conditions (1)-(12).

TABLE 4

| $\theta$ | 52.9 | $\theta_m$ | 58.75 | $R_{12}$ | 3.36 |
|---|---|---|---|---|---|
| $RS_{11}$ | 4.86 | $f_{12}$ | −2.73 | $f_{3456}$ | 6.43 |
| $D_1$ | 9.72 | | | | |
| TTL/f | 8.60 | TTL/$\theta$ | 0.398 | TTL/$\theta_m$ | 0.36 |
| TTL/$D_1$ | 2.17 | $f_1/R_{12}$ | −2.00 | $RS_{11}/f$ | 1.98 |
| $Vd_4 - Vd_5$ | 34.5 | $f_1/f$ | −2.74 | $f_2/f$ | −2.76 |
| $f_6/f$ | 4.00 | $f_{12}/f$ | −1.11 | $f_{12}/f_{3456}$ | −0.42 |

Figure 3A:
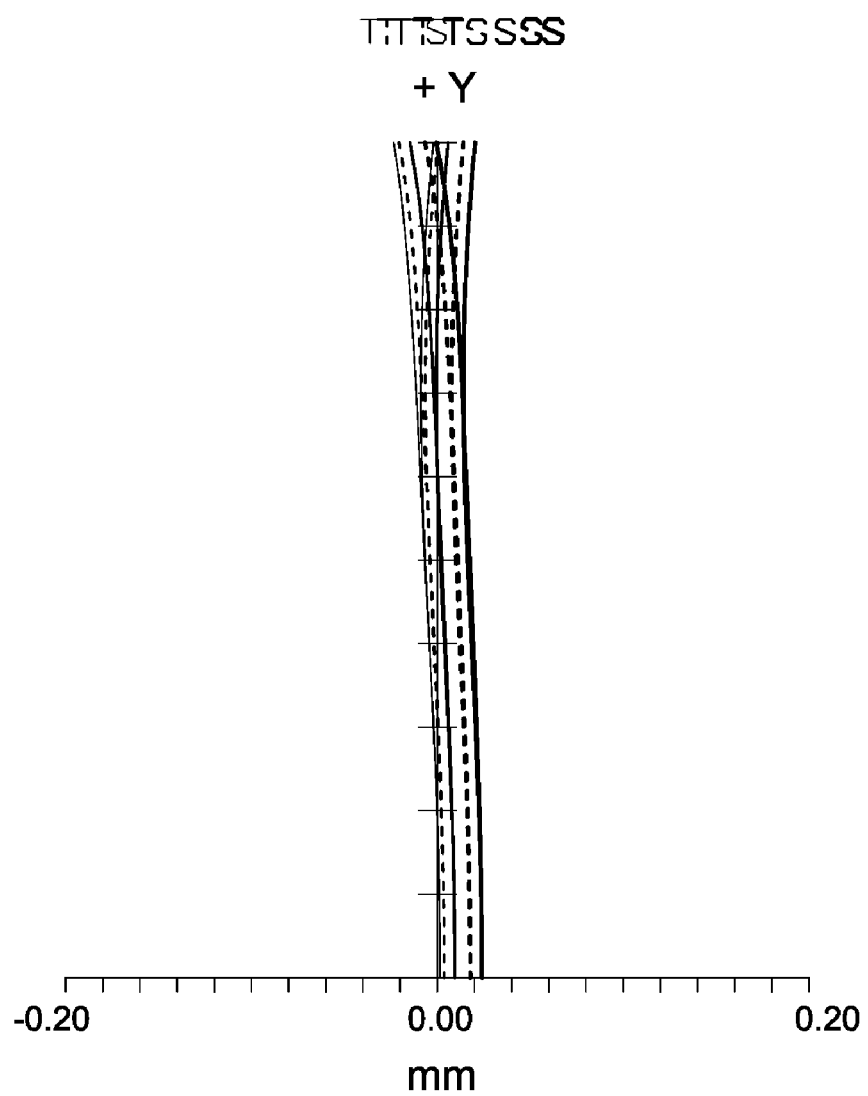
FIG. 3A depicts a field curvature diagram of a lens assembly in accordance with a second embodiment of the invention.

It can be seen from FIG. 3A that the field curvature of tangential direction and sagittal direction in the lens assembly 2 of the second embodiment ranges from −0.02 mm to 0.03 mm.

Figure 3B:
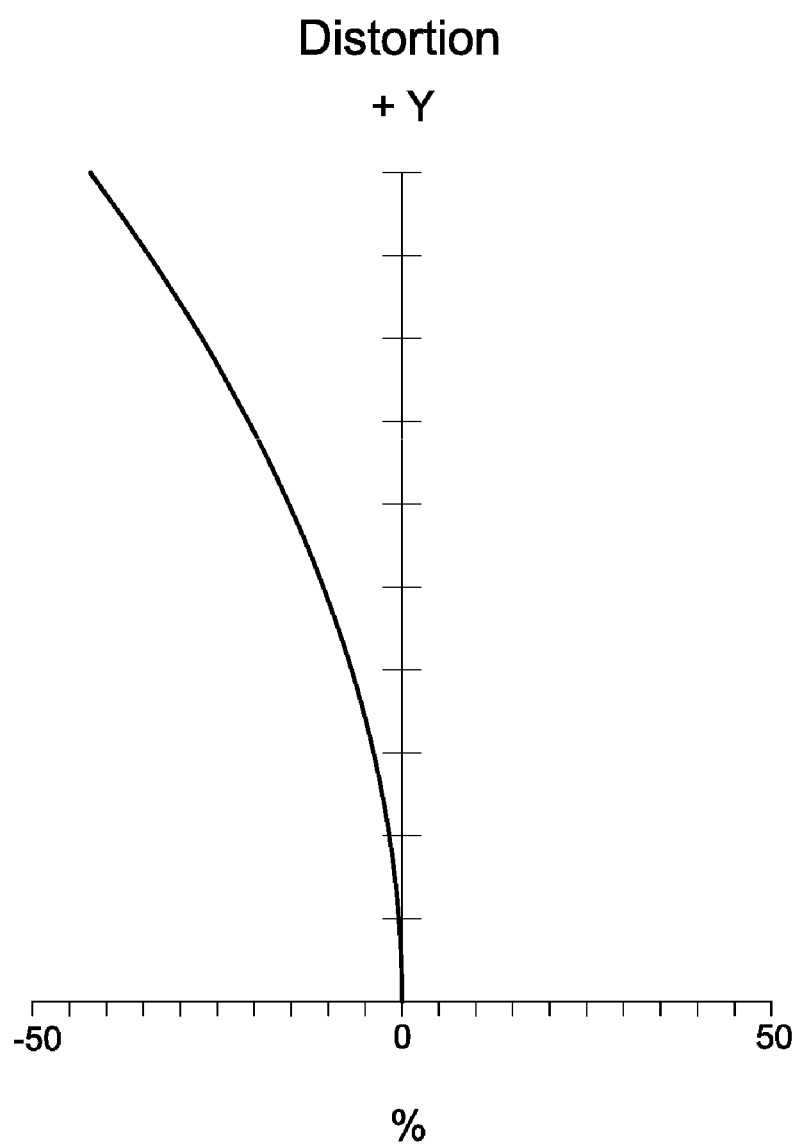
FIG. 3B is a distortion diagram of the lens assembly in accordance with the second embodiment of the invention.

It can be seen from FIG. 3B that the distortion in the lens assembly 2 of the second embodiment ranges from −45% to 0%.

Figure 3C:
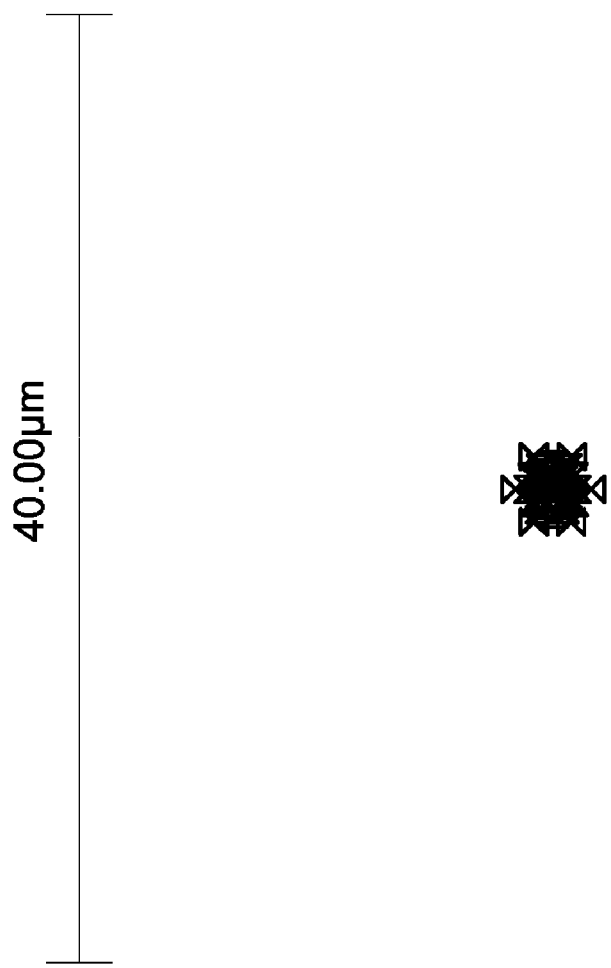
FIG. 3C is a spot diagram of the lens assembly in accordance with the second embodiment of the invention.

It can be seen from FIG. 3C that the root mean square spot radius is equal to 0.487 μm and geometrical spot radius is equal to 1.602 μm in the lens assembly 2 of the second embodiment.

Figure 3D:
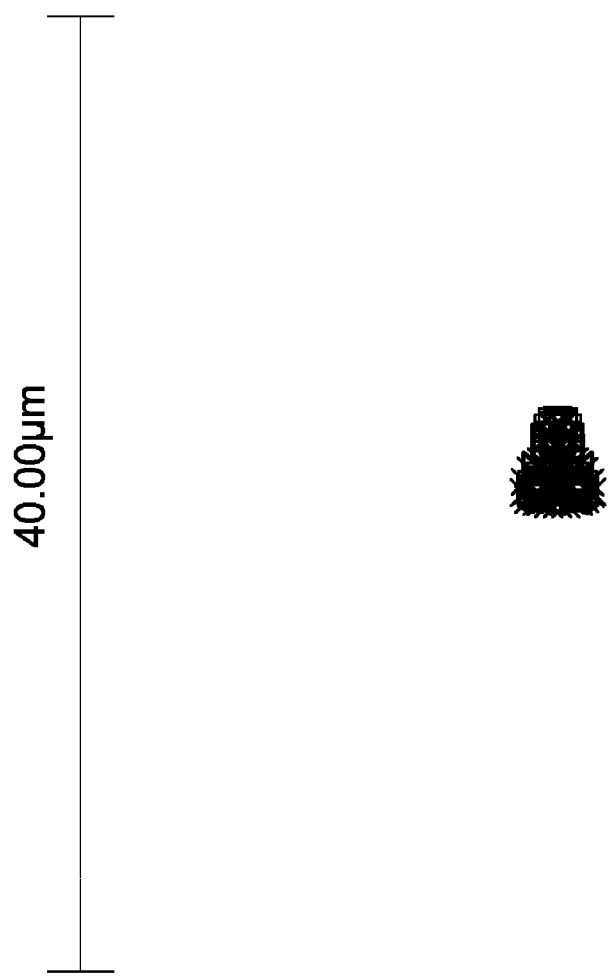
FIG. 3D is a spot diagram of the lens assembly in accordance with the second embodiment of the invention.

It can be seen from FIG. 3D that the root mean square spot radius is equal to 1.053 μm and geometrical spot radius is equal to 3.120 μm in the lens assembly 2 of the second embodiment.

Figure 3E:
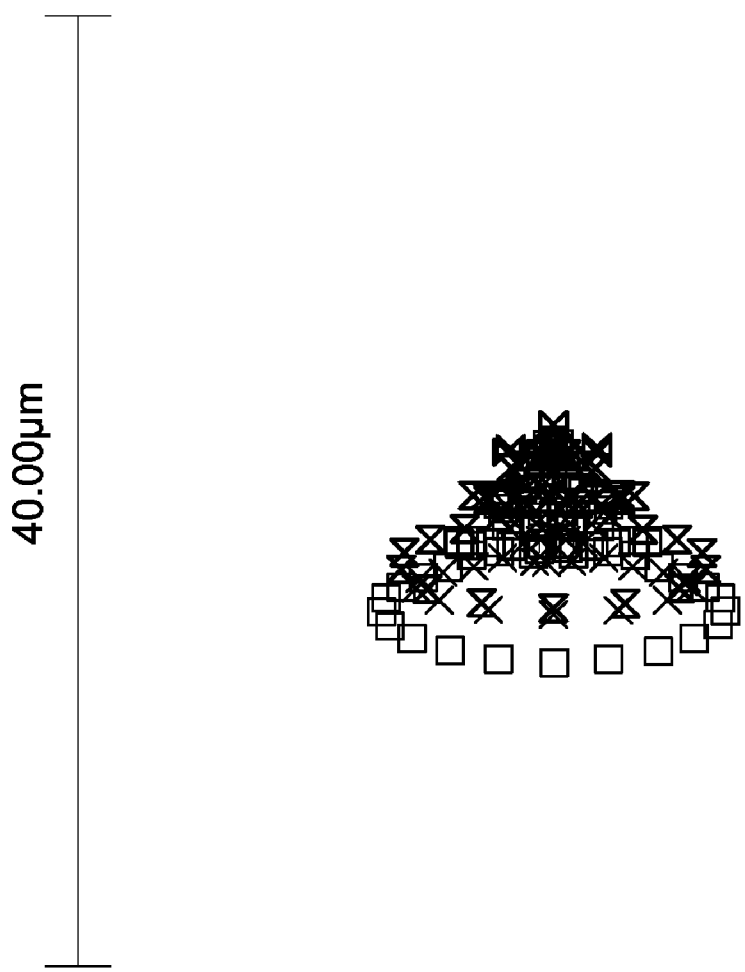
FIG. 3E is a spot diagram of the lens assembly in accordance with the second embodiment of the invention.

It can be seen from FIG. 3E that the root mean square spot radius is equal to 3.407 μm and geometrical spot radius is equal to 8.915 μm in the lens assembly 2 of the second embodiment.

It is obvious that the field curvature and the distortion of the lens assembly 2 of the second embodiment can be corrected effectively. Therefore, the lens assembly 2 of the second embodiment is capable of good optical performance.

In the third embodiment of the lens assembly, the lens assembly 3 includes a first lens L31, a second lens L32, a third lens L33, a stop ST3, a fourth lens L34, a fifth lens L35, a sixth lens L36, an optical filter OF3, and a cover glass CG3, all of which are arranged in order from an object side to an image side along an optical axis OA3. In operation, an image of light rays from the object side is formed at an image plane IMA3.

According to paragraphs [0054]-[0064], the surface profiles of the first lens L31, the second lens L32, the third lens L33, the fourth lens L34, the fifth lens L35, and the sixth lens L36 approximate to that of the lens assembly 1 of the first embodiment, and is not described here again; the sign of the refractive power of the sixth lens L36 is the same as that of the sixth lens L16 in the first embodiment; the fourth lens L34 and the fifth lens L35 are cemented; both of the object side surface S313 and image side surface S314 of the optical filter OF3 are plane surfaces; and both of the object side surface S315 and image side surface S316 of the cover glass CG3 are plane surfaces.

With the above design of the lenses and stop ST3 and at least any one of the conditions (1)-(12) satisfied, the lens assembly 3 can have an effective shortened total lens length and is capable of an effective corrected aberration and an effective corrected chromatic aberration.

Table 5 shows optical specifications of the lens assembly 3 wherein the effective focal length is equal to 2.4147 mm, F-number is equal to 2.4, total lens length is equal to 21.15 mm, and field of view is equal to 105.8 degrees.

TABLE 5

| Surface Number | Radius of Curvature (mm) | Thickness (mm) | Nd | Vd | Effective Focal Length (mm) | Remark |
|---|---|---|---|---|---|---|
| S31 | 10.06 | 0.68 | 1.70 | 56.4 | −7.45 | The First Lens L31 |
| S32 | 3.33 | 3.26 | | | | |
| S33 | −18.19 | 0.71 | 1.52 | 64.1 | −6.95 | The Second Lens L32 |
| S34 | 4.55 | 1.95 | | | | |
| S35 | 8.75 | 1.21 | 1.85 | 32.2 | 7.69 | The Third Lens L33 |
| S36 | −24.77 | 3.15 | | | | |
| S37 | ∞ | 1.10 | | | | Stop ST3 |
| S38 | 17.27 | 1.73 | 1.70 | 55.4 | 3.79 | The Fourth Lens L34 |
| S39 | −3.00 | 0.60 | 1.92 | 20.9 | −6.10 | The Fifth Lens L35 |
| S310 | −6.97 | 0.07 | | | | |
| S311 | 10.21 | 0.94 | 1.84 | 43.1 | 10.89 | The Sixth Lens L36 |
| S312 | −83.18 | 0.00 | | | | |
| S313 | ∞ | 0.40 | 1.52 | 64.2 | | Optical Filter OF3 |
| S314 | ∞ | 4.94 | | | | |
| S315 | ∞ | 0.40 | 1.52 | 64.2 | | Cover Glass CG3 |

Table 6 shows the parameters and condition values for conditions (1)-(12) in accordance with the third embodiment of the invention. It can be seen from Table 6 that the lens assembly 3 of the third embodiment satisfies the conditions (1)-(12).

TABLE 6

| $\theta$ | 52.9 | $\theta_m$ | 58.75 | $R_{12}$ | 3.33 |
|---|---|---|---|---|---|
| $RS_{11}$ | 4.965 | $f_{12}$ | −2.9 | $f_{3456}$ | 5.89 |
| $D_1$ | 9.93 | | | | |
| TTL/f | 8.76 | TTL/$\theta$ | 0.400 | TTL/$\theta_m$ | 0.36 |
| TTL/$D_1$ | 2.13 | $f_1/R_{12}$ | −2.24 | $RS_{11}/f$ | 2.06 |

TABLE 6-continued

| $Vd_4 - Vd_5$ | 34.5 | $f_1/f$ | -3.09 | $f_2/f$ | -2.88 |
| $f_6/f$ | 4.51 | $f_{12}/f$ | -1.20 | $f_{12}/f_{3456}$ | -0.49 |

Figure 4A:
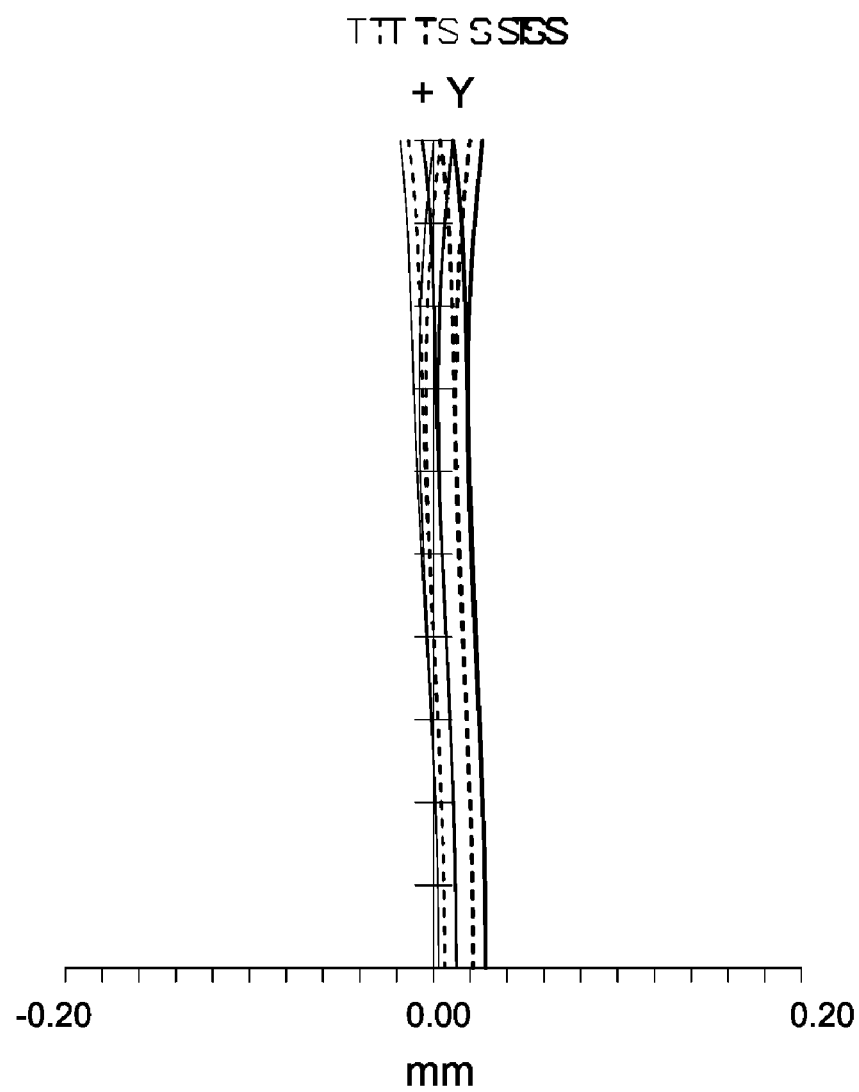
FIG. 4A depicts a field curvature diagram of a lens assembly in accordance with a third embodiment of the invention.

It can be seen from FIG. 4A that the field curvature of tangential direction and sagittal direction in the lens assembly 3 of the third embodiment ranges from −0.02 mm to 0.03 mm.

Figure 4B:
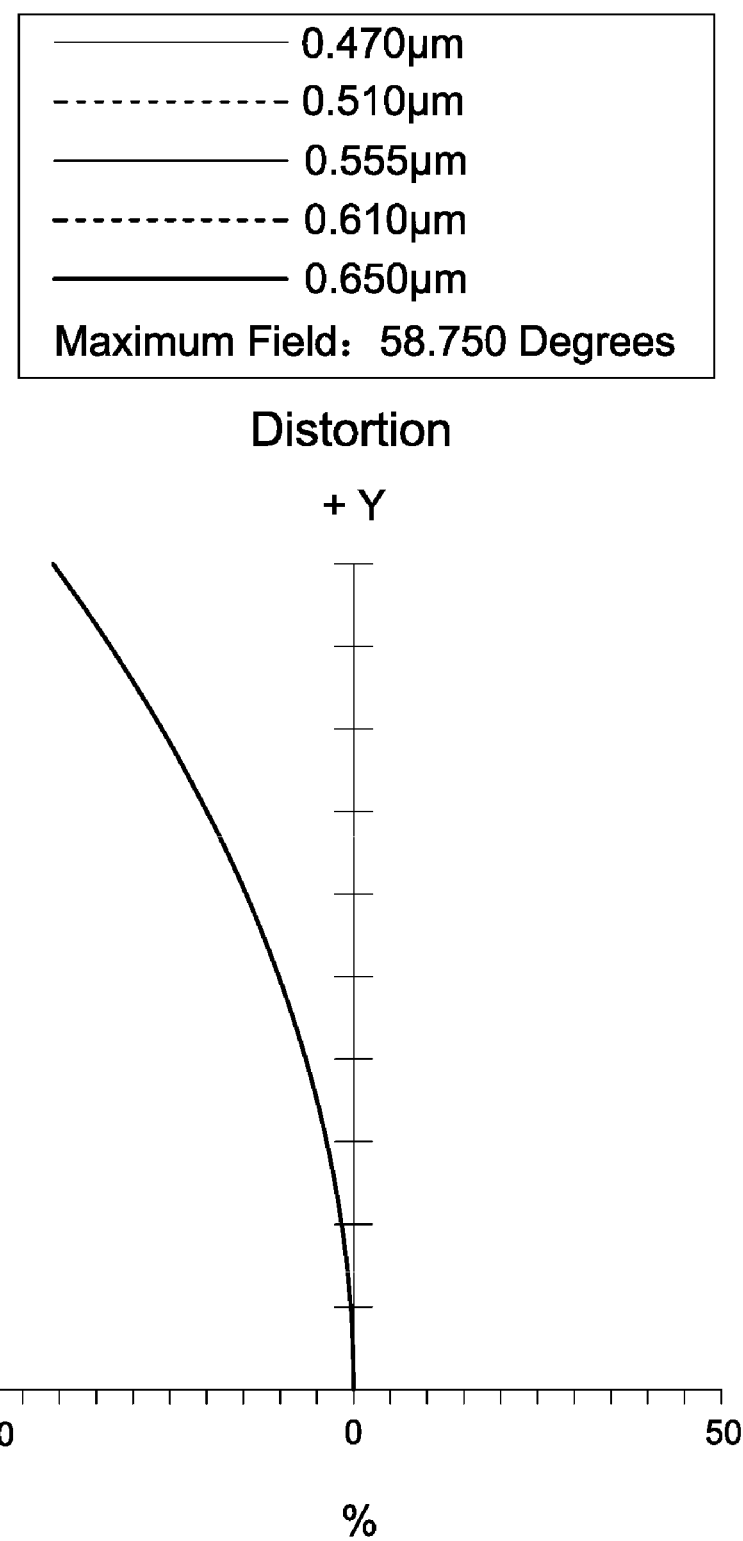
FIG. 4B is a distortion diagram of the lens assembly in accordance with the third embodiment of the invention.

It can be seen from FIG. 4B that the distortion in the lens assembly 3 of the third embodiment ranges from −45% to 0%.

Figure 4C:
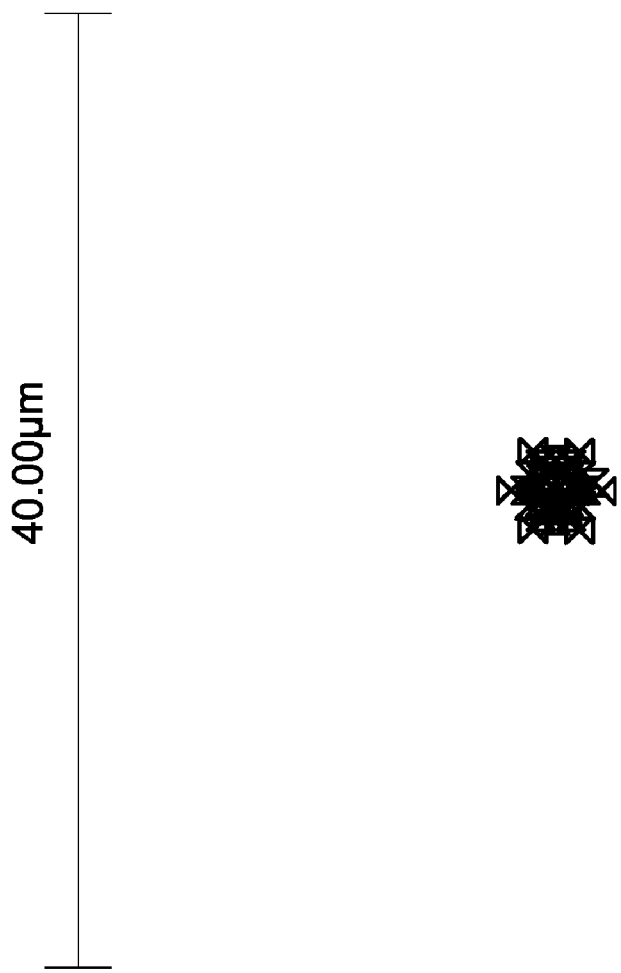
FIG. 4C is a spot diagram of the lens assembly in accordance with the third embodiment of the invention.

It can be seen from FIG. 4C that the root mean square spot radius is equal to 0.573 μm and geometrical spot radius is equal to 1.887 μm in the lens assembly 3 of the third embodiment.

Figure 4D:
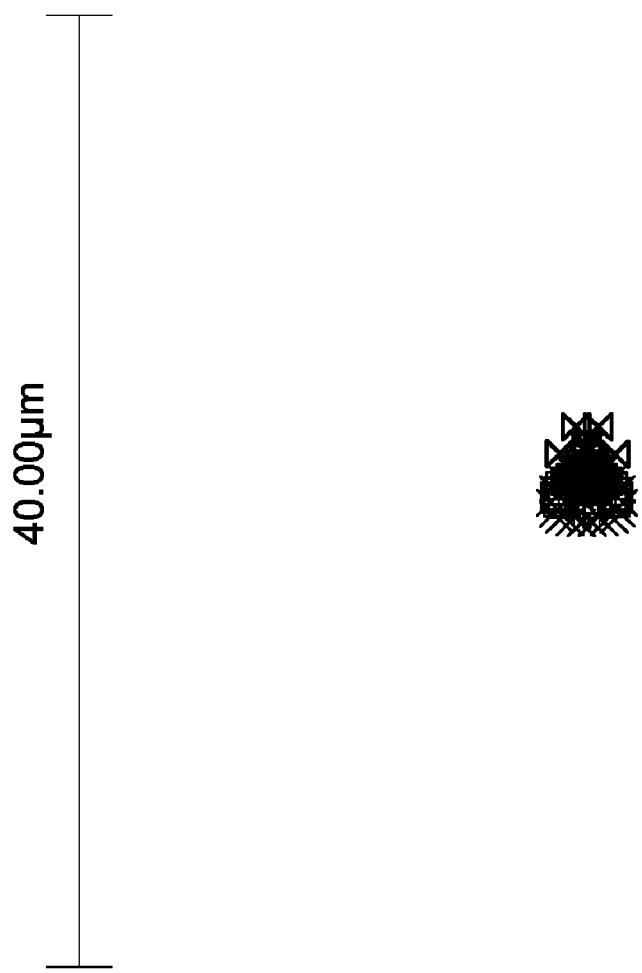
FIG. 4D is a spot diagram of the lens assembly in accordance with the third embodiment of the invention.

It can be seen from FIG. 4D that the root mean square spot radius is equal to 0.905 μm and geometrical spot radius is equal to 2.713 μm in the lens assembly 3 of the third embodiment.

It can be seen from FIG. 4E that the root mean square spot radius is equal to 3.801 μm and geometrical spot radius is equal to 9.647 μm in the lens assembly 3 of the third embodiment.

It is obvious that the field curvature and the distortion of the lens assembly 3 of the third embodiment can be corrected effectively. Therefore, the lens assembly 3 of the third embodiment is capable of good optical performance.

In the fourth embodiment of the lens assembly, the lens assembly 4 includes a first lens L41, a second lens L42, a third lens L43, a fourth lens L44, a stop ST4, a fifth lens L45, a sixth lens L46, an optical filter OF4, and a cover glass CG4, all of which are arranged in order from an object side to an image side along an optical axis OA4. In operation, an image of light rays from the object side is formed at an image plane IMA4.

According to paragraphs [0054]-[0064], the surface profiles of the first lens L41, the second lens L42, the third lens L43, the fourth lens L44, the fifth lens L45, and the sixth lens L46 approximate to that of the lens assembly 1 of the first embodiment, and is not described here again; the sign of the refractive power of the sixth lens L46 is the same as that of the sixth lens L16 in the first embodiment; the fourth lens L44 and the fifth lens L45 are cemented; both of the object side surface S413 and image side surface S414 of the optical filter OF4 are plane surfaces; and both of the object side surface S415 and image side surface S416 of the cover glass CG4 are plane surfaces.

With the above design of the lenses and stop ST4 and at least any one of the conditions (1)-(12) satisfied, the lens assembly 4 can have an effective shortened total lens length and is capable of an effective corrected aberration and an effective corrected chromatic aberration.

Table 7 shows the optical specification of the lens assembly 4 wherein the effective focal length is equal to 2.5 mm, F-number is equal to 1.85, total lens length is equal to 21.1 mm, and field of view is equal to 105.8 degrees.

TABLE 7

| Surface Number | Radius of Curvature (mm) | Thickness (mm) | Nd | Vd | Effective Focal Length (mm) | Remark |
| --- | --- | --- | --- | --- | --- | --- |
| S41 | 9.40 | 0.70 | 1.69 | 50.8 | -7.79 | The First Lens L41 |
| S42 | 3.33 | 3.17 | | | | |
| S43 | -5.31 | 0.70 | 1.52 | 64.1 | -5.01 | The Second Lens L42 |

TABLE 7-continued

| Surface Number | Radius of Curvature (mm) | Thickness (mm) | Nd | Vd | Effective Focal Length (mm) | Remark |
| --- | --- | --- | --- | --- | --- | --- |
| S44 | 5.31 | 0.70 | | | | |
| S45 | 10.97 | 2.09 | 1.85 | 32.3 | 6.00 | The Third Lens L43 |
| S46 | -8.79 | 3.41 | | | | |
| S47 | ∞ | 0.74 | | | | Stop ST4 |
| S48 | 13.95 | 2.05 | 1.59 | 68.4 | 4.35 | The Fourth Lens L44 |
| S49 | -3.00 | 0.60 | 1.92 | 20.9 | -7.93 | The Fifth Lens L45 |
| S410 | -5.54 | 0.07 | | | | |
| S411 | 17.15 | 1.13 | 1.83 | 42.7 | 10.38 | The Sixth Lens L46 |
| S412 | -17.15 | 1.70 | | | | |
| S413 | ∞ | 0.40 | 1.52 | 54.8 | | Optical Filter OF4 |
| S414 | ∞ | 3.12 | | | | |
| S415 | ∞ | 0.52 | 1.52 | 54.8 | | Cover Glass CG4 |
| S416 | ∞ | 0.12 | | | | |

Table 8 shows the parameters and condition values for conditions (1)-(12) in accordance with the fourth embodiment of the invention. It can be seen from Table 8 that the lens assembly 4 of the fourth embodiment satisfies the conditions (1)-(12).

TABLE 8

| θ | 52.9 | $θ_m$ | 58.75 | $R_{12}$ | 3.33 |
| $RS_{11}$ | 4.63 | $f_{12}$ | -2.45 | $f_{3456}$ | 6.47 |
| $D_1$ | 9.26 | | | | |
| TTL/f | 8.44 | TTL/θ | 0.399 | TTL/$θ_m$ | 0.36 |
| TTL/$D_1$ | 2.28 | $f_1/R_{12}$ | -2.34 | $RS_{11}/f$ | 1.85 |
| $Vd_4 - Vd_5$ | 47.5 | $f_1/f$ | -3.12 | $f_2/f$ | -2.00 |
| $f_6/f$ | 4.15 | $f_{12}/f$ | -0.98 | $f_{12}/f_{3456}$ | -0.38 |

Figure 5A:
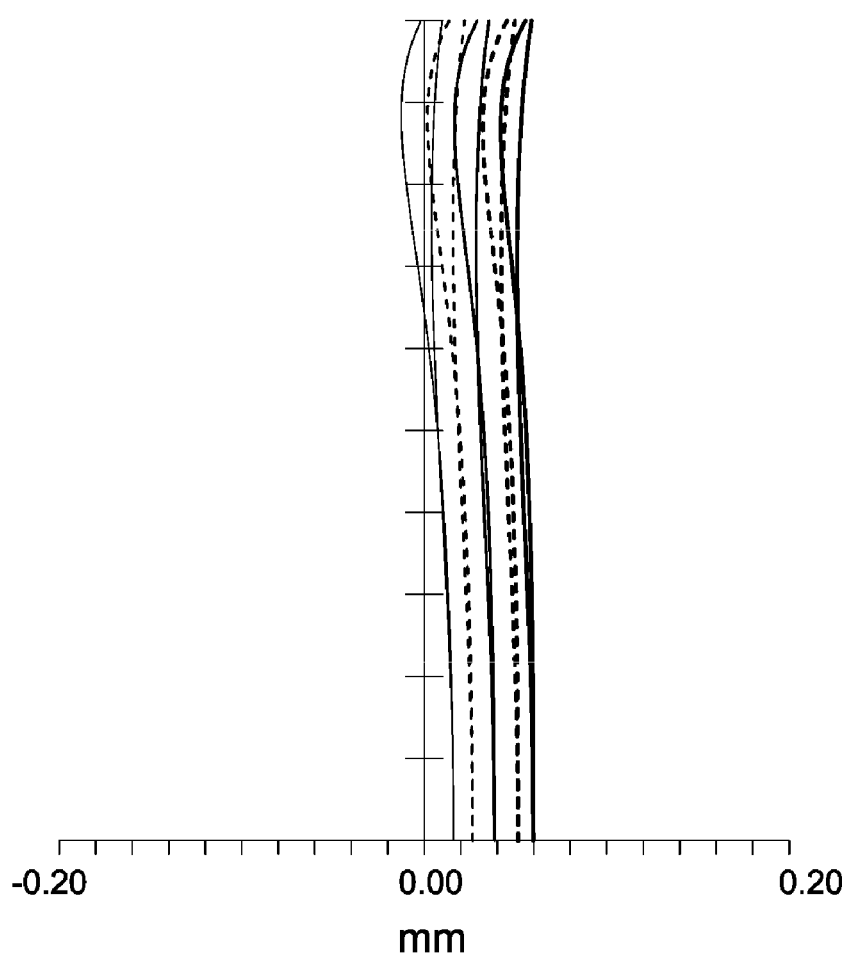
FIG. 5A depicts a field curvature diagram of a lens assembly in accordance with a fourth embodiment of the invention.

It can be seen from FIG. 5A that the field curvature of tangential direction and sagittal direction in the lens assembly 4 of the fourth embodiment ranges from −0.02 mm to 0.06 mm.

Figure 5B:
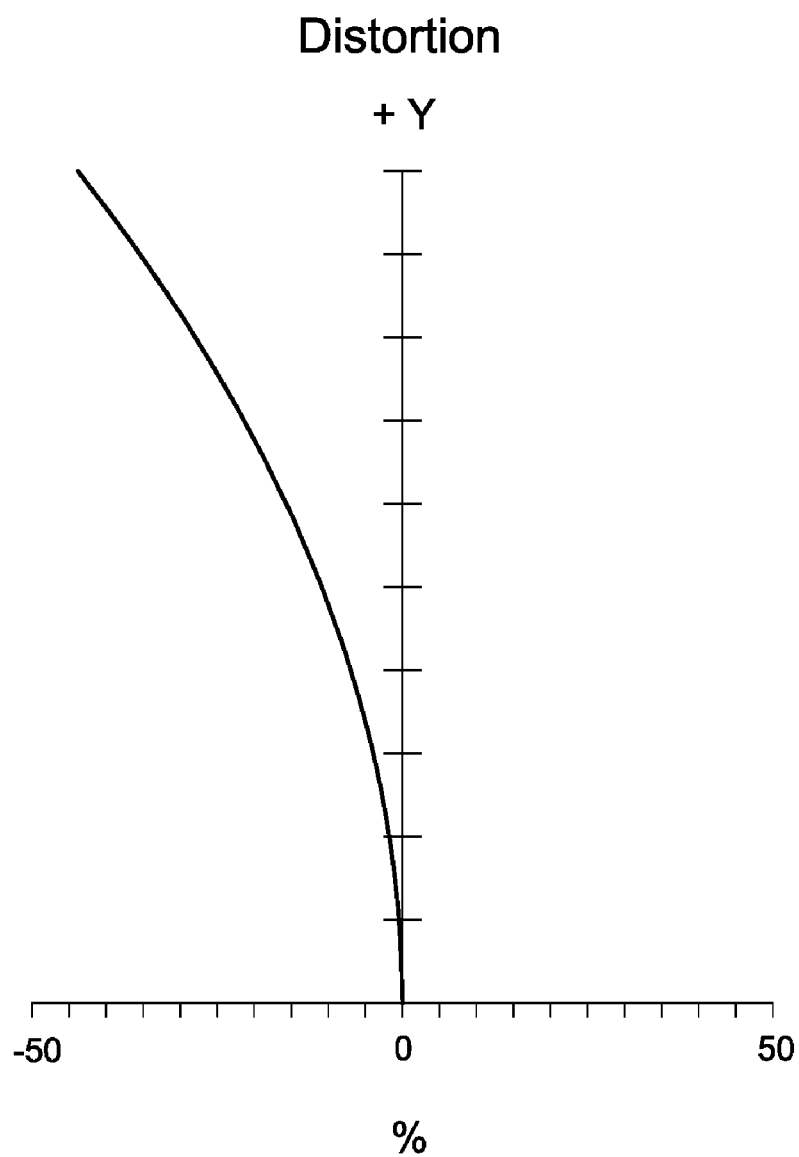
FIG. 5B is a distortion diagram of the lens assembly in accordance with the fourth embodiment of the invention.

It can be seen from FIG. 5B that the distortion in the lens assembly 4 of the fourth embodiment ranges from −45% to 0%.

Figure 5C:
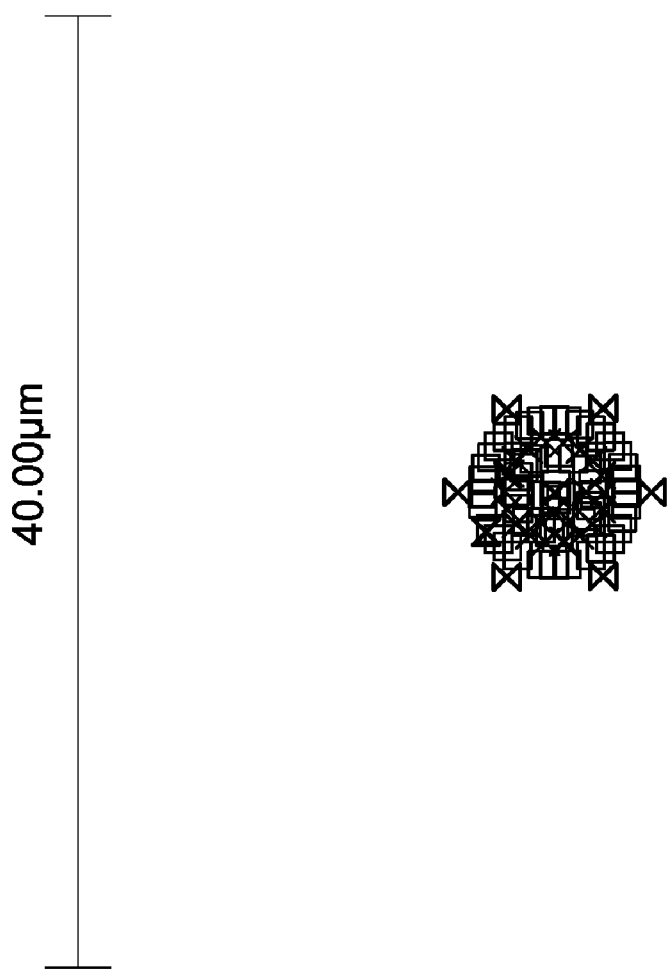
FIG. 5C is a spot diagram of the lens assembly in accordance with the fourth embodiment of the invention.

It can be seen from FIG. 5C that the root mean square spot radius is equal to 1.931 μm and geometrical spot radius is equal to 4.072 μm in the lens assembly 4 of the fourth embodiment.

Figure 5D:
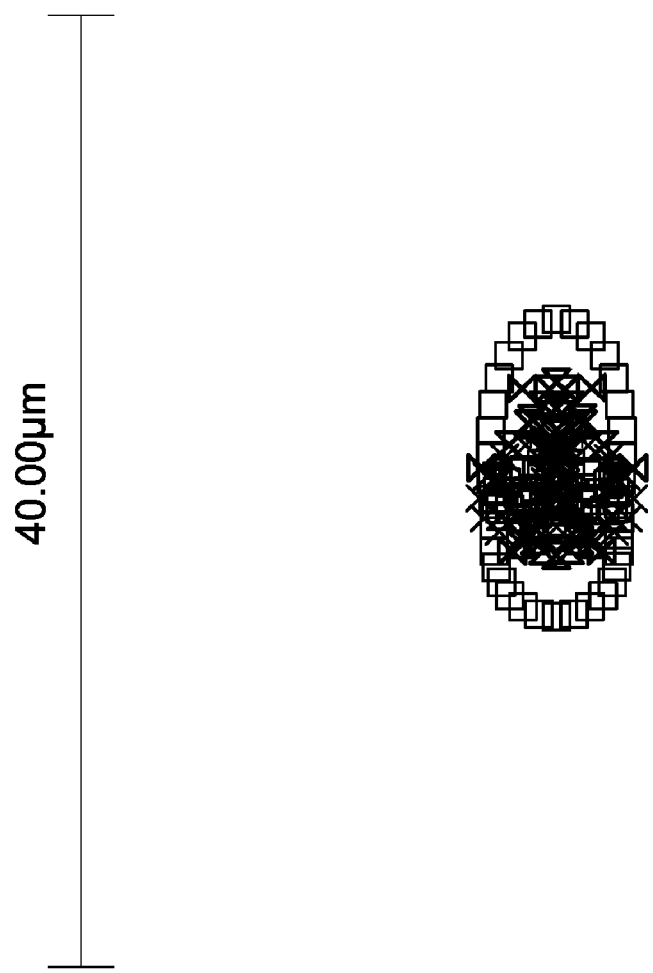
FIG. 5D is a spot diagram of the lens assembly in accordance with the fourth embodiment of the invention.

It can be seen from FIG. 5D that the root mean square spot radius is equal to 2.458 μm and geometrical spot radius is equal to 7.211 μm in the lens assembly 4 of the fourth embodiment.

Figure 5E:
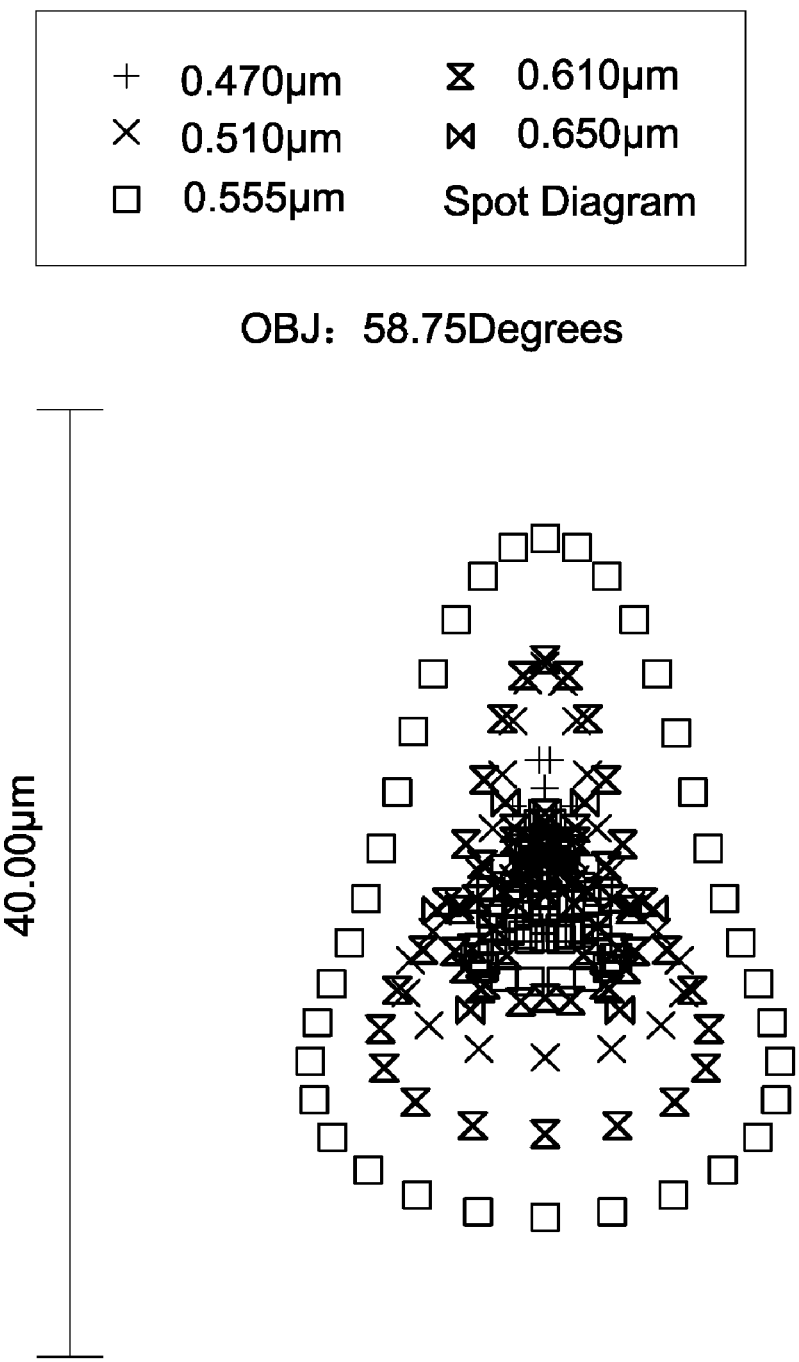
FIG. 5E is a spot diagram of the lens assembly in accordance with the fourth embodiment of the invention.

It can be seen from FIG. 5E that the root mean square spot radius is equal to 5.795 μm and geometrical spot radius is equal to 14.658 μm in the lens assembly 4 of the fourth embodiment.

It is obvious that the field curvature and the distortion of the lens assembly 4 of the fourth embodiment can be corrected effectively. Therefore, the lens assembly 4 of the fourth embodiment is capable of good optical performance.

Referring to FIG. 6, FIG. 6 is a lens layout diagram of a lens assembly in accordance with a fifth embodiment of the invention. The lens assembly 5 includes a first lens group, a second lens group, a third lens group, a stop ST5, a fourth lens group, a fifth lens group, and an optical filter OF5, all of which are arranged in order from an object side to an image side along an optical axis OA5, wherein the first lens group includes a first lens L51, the second lens group includes a second lens L52, the third lens group includes a third lens L53, the fourth lens group includes a fourth lens L54 and a fifth lens L55, and the fifth lens group includes a sixth lens L56. In operation, an image of light rays from the object side is formed at an image plane IMA5.

The first lens L51 is a meniscus lens with negative refractive power, wherein the object side surface S51 is a convex surface and the image side surface S52 is a concave surface.

The second lens L52 is a meniscus lens with negative refractive power, wherein the object side surface S53 is a concave surface and the image side surface S54 is a convex surface.

The third lens L53 is with positive refractive power, wherein the object side surface S55 is a convex surface and the image side surface S56 is a convex surface.

The fourth lens L54 is a biconvex lens with positive refractive power, wherein the object side surface S58 is a convex surface and the image side surface S59 is a convex surface.

The fifth lens L55 is a meniscus lens with negative refractive power, wherein the object side surface S510 is a concave surface and the image side surface S511 is a convex surface.

The image side surface S59 of the fourth lens L54 and the object side surface S510 of the fifth lens L55 are cemented.

The sixth lens L56 is a biconvex lens with positive refractive power, wherein the object side surface S512 is a convex surface and the image side surface S513 is a convex surface.

Both of the object side surface S514 and image side surface S515 of the optical filter OF5 are plane surfaces.

The object side surface S511 and the image side surface S512 of the sixth lens L56 are spherical surfaces or aspheric surfaces. The first lens L51, the second lens L52, the third lens L53, the fourth lens L54, and the fifth lens L55 are made of glass material and the sixth lens L56 is made of plastic material in order to compensate temperature drift.

If the value $f_1/f$ of condition (13) is greater than −0.8, it is difficult to provide a strong enough refractive power. Therefore, the value $f_1/f$ must be smaller than −0.8, so that the optimal range for $f_1/f$ is between −1.5 and −0.8. When satisfying the condition: $-1.5 < f_1/f < -0.8$, the lens assembly 5 can provide strong enough refractive power.

With the above design of the lenses and stop ST5 and at least any one of the conditions (13)-(18) satisfied, the lens assembly 5 can have an effective shortened total lens length, an effective decreased F-number, an effective increased field of view, a resistance to environment temperature variation, an effective decreased defocus, and an effective increased resolution.

Table 9 shows the optical specification in accordance with the fifth embodiment of the invention wherein the effective focal length is equal to 2.97 mm, F-number is equal to 2.4, and field of view is equal to 150 degrees.

TABLE 9

Effective Focal Length = 2.97 mm
F-number = 2.4
Field of View = 150 Degrees

| Surface Number | Radius of Curvature (mm) | Thickness (mm) | Diameter (mm) | Nd | Vd | Remark |
|---|---|---|---|---|---|---|
| S51 | 17.43 | 0.55 | 6.68 | 1.70 | 55.53 | The First Lens L51 |
| S52 | 2.28 | 2.21 | 3.96 | | | |
| S53 | −3.38 | 1.05 | 3.04 | 1.91 | 35.26 | The Second Lens L52 |
| S54 | −5.65 | 0.08 | 3.00 | | | |
| S55 | 9.13 | 1.40 | 2.93 | 1.88 | 40.81 | The Third Lens L53 |
| S56 | −9.13 | 0.04 | 2.71 | | | |
| S57 | ∞ | 1.92 | 2.61 | | | Stop ST5 |
| S58 | 10.04 | 2.30 | 4.03 | 1.62 | 63.41 | The Fourth Lens L54 |
| S59 | −2.94 | 0.00 | 4.33 | | | |
| S510 | −2.94 | 0.50 | 4.33 | 1.92 | 20.88 | The Fifth Lens L55 |
| S511 | −7.07 | 0.32 | 4.90 | | | |
| S512 | 8.28 | 1.41 | 5.73 | 1.54 | 55.78 | The Sixth Lens L56 |
| S513 | −41.58 | 0.50 | 5.74 | | | |
| S514 | ∞ | 0.61 | 5.84 | 1.52 | 64.21 | Optical Filter OF5 |
| S515 | ∞ | 3.57 | 5.94 | | | |

The aspheric surface sag z of each lens in table 9 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the fifth embodiment, the conic constant k and the aspheric coefficients A, B, C, D, E, F, G of each surface are shown in Table 10.

TABLE 10

| Surface Number | k | A E | B F | C G | D |
|---|---|---|---|---|---|
| S512 | 4.75 | −1.54E−03 0.00E+00 | 2.63E−04 0.00E+00 | −2.41E−05 0.00E+00 | 4.95E−08 |
| S513 | 6.73 | 1.84E−03 1.56E−07 | 1.50E−04 0.00E+00 | 1.17E−05 0.00E+00 | −3.14E−06 |

Table 11 shows the parameters and condition values for conditions (13)-(18) in accordance with the fifth embodiment of the invention. It can be seen from Table 11 that the lens assembly 5 of the fifth embodiment satisfies the conditions (13)-(18).

TABLE 11

| f | 2.97 mm | $f_1$ | −3.81 mm | $f_2$ | −11.80 mm |
|---|---|---|---|---|---|
| $f_6$ | 13.00 mm | $f_{12}$ | −2.69 mm | $f_{3456}$ | 4.38 mm |
| TTL | 16.46 mm | $D_1$ | 6.68 mm | | |
| $f_1/f$ | −1.28 | $f_2/f$ | −3.97 | $f_{12}/f$ | −0.90 |
| $f_6/f$ | 4.37 | $f_{12}/f_{3456}$ | −0.61 | $TTL/D_1$ | 2.46 |

Figure 7A:
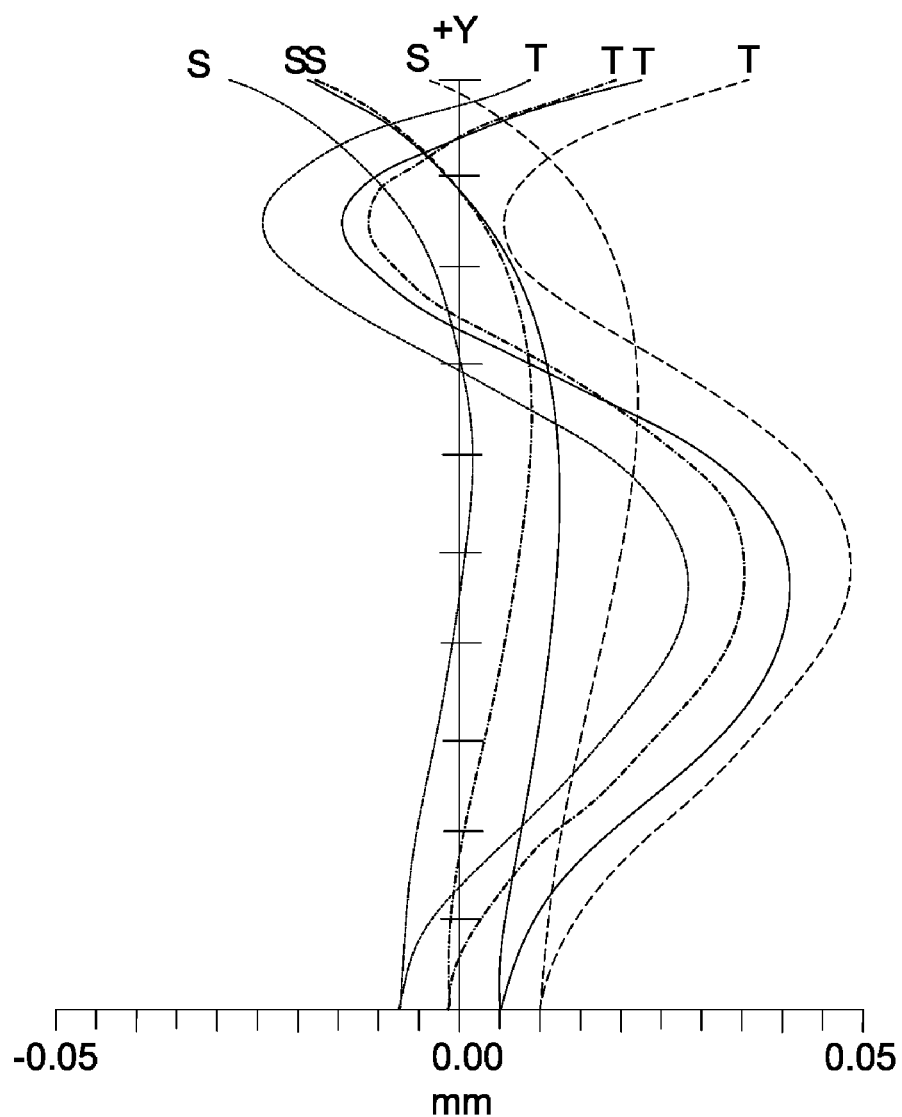
FIG. 7A depicts a field curvature diagram of the lens assembly in accordance with the fifth embodiment of the invention.

It can be seen from FIG. 7A that the field curvature of tangential direction and sagittal direction in the lens assembly 5 of the fifth embodiment ranges from −0.03 mm to 0.05 mm for the wavelength of 470 nm, 510 nm, 555 nm, and 850 nm.

Figure 7B:
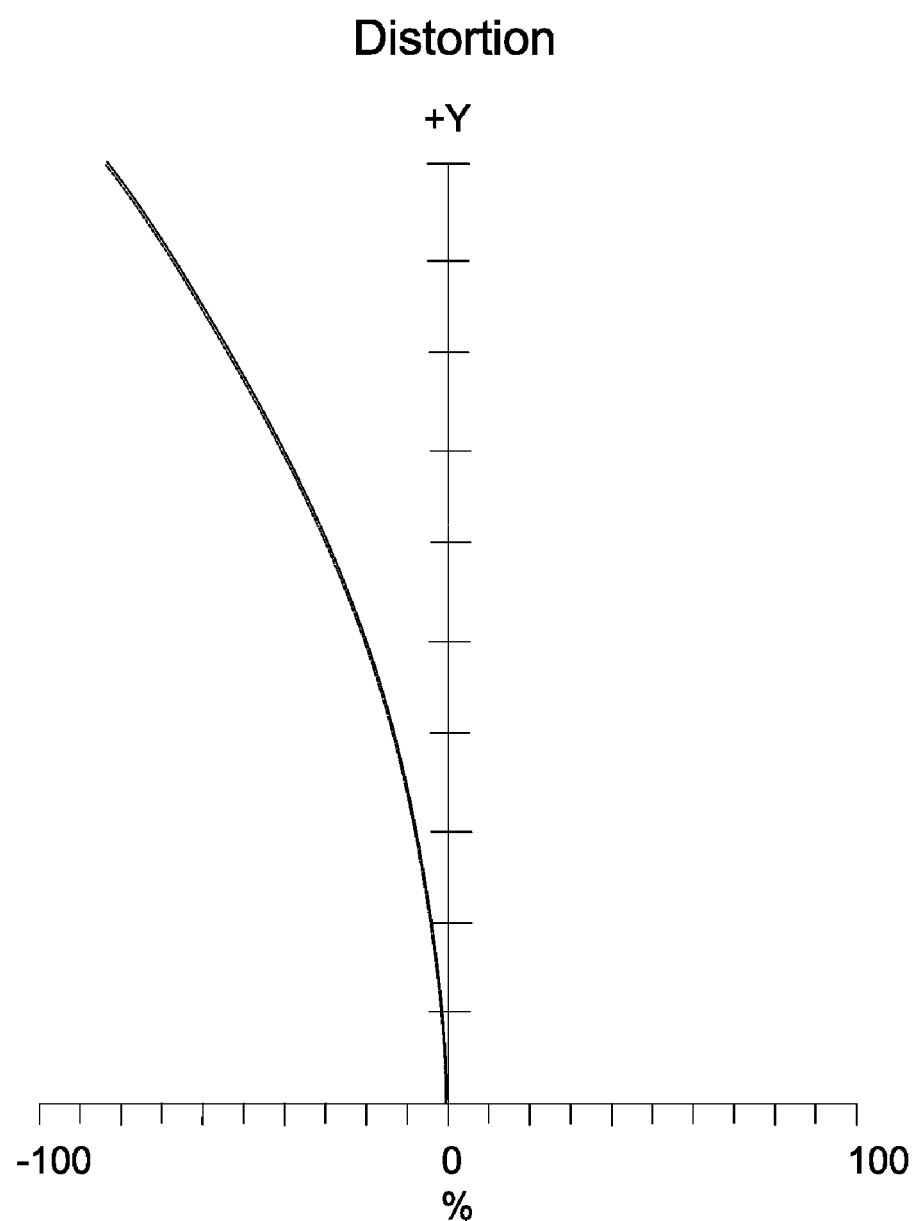
FIG. 7B is a distortion diagram of the lens assembly in accordance with the fifth embodiment of the invention.

It can be seen from FIG. 7B that the distortion in the lens assembly 5 of the fifth embodiment ranges from −80% to 0% for the wavelength of 470 nm, 510 nm, 555 nm, and 850 nm.

It can be seen from FIG. 7C that the longitudinal aberration in the lens assembly 5 of the fifth embodiment ranges from −0.01 mm to 0.03 mm for the wavelength of 470 nm, 510 nm, 555 nm and 850 nm.

It is obvious that the field curvature, distortion, and the longitudinal aberration of the lens assembly 5 of the fifth embodiment can be corrected effectively. Therefore, the lens assembly 5 of the fifth embodiment is capable of good optical performance.

Figure 8:
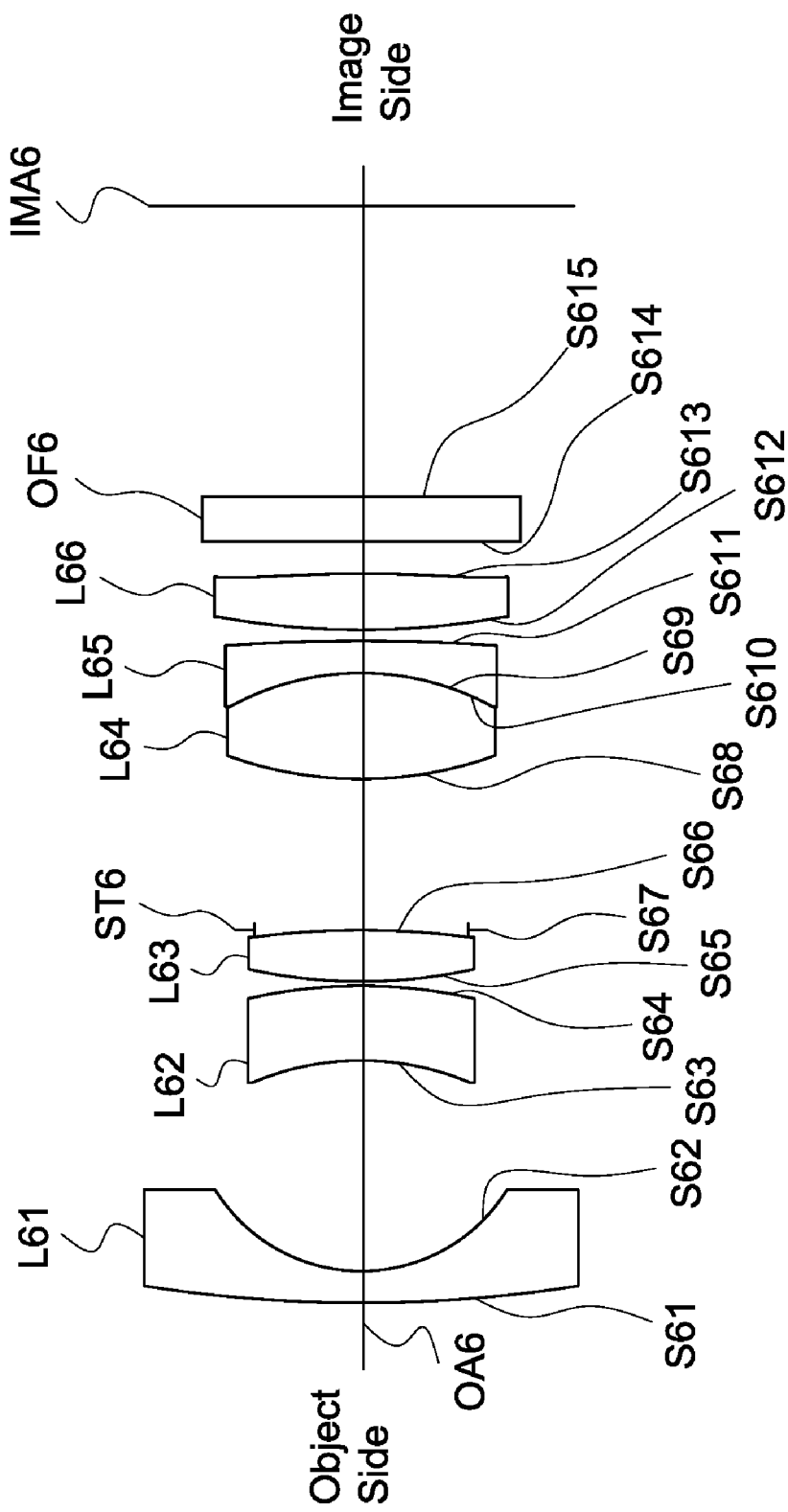
FIG. 8 is a lens layout diagram of a lens assembly in accordance with a sixth embodiment of the invention.

Referring to FIG. 8, FIG. 8 is a lens layout diagram of a lens assembly in accordance with a sixth embodiment of the invention. The lens assembly 6 includes a first lens group, a second lens group, a third lens group, a stop ST6, a fourth lens group, a fifth lens group, and an optical filter OF6, all of which are arranged in order from an object side to an image side along an optical axis OA6, wherein the first lens group includes a first lens L61, the second lens group includes a second lens L62, the third lens group includes a third lens L63, the fourth lens group includes a fourth lens L64 and a fifth lens L65, and the fifth lens group includes a sixth lens L66. In operation, an image of light rays from the object side is formed at an image plane IMA6.

The first lens L61 is a meniscus lens with negative refractive power, wherein the object side surface S61 is a convex surface and the image side surface S62 is a concave surface.

The second lens L62 is a meniscus lens with negative refractive power, wherein the object side surface S63 is a concave surface and the image side surface S64 is a convex surface.

The third lens L63 is with positive refractive power, wherein the object side surface S65 is a convex surface and the image side surface S66 is a convex surface.

The fourth lens L64 is a biconvex lens with positive refractive power, wherein the object side surface S68 is a convex surface and the image side surface S69 is a convex surface.

The fifth lens L65 is a meniscus lens with negative refractive power, wherein the object side surface S610 is a concave surface and the image side surface S611 is a convex surface.

The image side surface S69 of the fourth lens L64 and the object side surface S610 of the fifth lens L65 are cemented.

The sixth lens L66 is a biconvex lens with positive refractive power, wherein the object side surface S612 is a convex surface and the image side surface S613 is a convex surface.

Both of the object side surface S614 and image side surface S615 of the optical filter OF6 are plane surfaces.

The object side surface S611 and the image side surface S612 of the sixth lens L66 are spherical surfaces or aspheric surfaces. The first lens L61, the second lens L62, the third lens L63, the fourth lens L64, and the fifth lens L65 are made of glass material and the sixth lens L66 is made of plastic material in order to compensate temperature drift.

If the value $f_2/f$ of condition (14) is greater than −3.5, it is difficult to provide a strong enough refractive power. Therefore, the value $f_2/f$ must be smaller than −3.5, so that the optimal range for $f_2/f$ is between −4.5 and −3.5. When satisfying the condition: $-4.5<f_2/f<-3.5$, the lens assembly 6 can provide strong enough refractive power.

With the above design of the lenses and stop ST6 and at least any one of the conditions (13)-(18) satisfied, the lens assembly 6 can have an effective shortened total lens length, an effective decreased F-number, an effective increased field of view, a resistance to environment temperature variation, an effective decreased defocus, and an effective increased resolution.

Table 12 shows the optical specification in accordance with the sixth embodiment of the invention wherein the effective focal length is equal to 3.39 mm, F-number is equal to 2.2, and field of view is equal to 120 degrees.

TABLE 12

Effective Focal Length = 3.39 mm
F-number = 2.2
Field of View = 120 Degrees

| Surface Number | Radius of Curvature (mm) | Thickness (mm) | Diameter (mm) | Nd | Vd | Remark |
|---|---|---|---|---|---|---|
| S61 | 22.54 | 0.50 | 6.68 | 1.69 | 54.57 | The First Lens L61 |
| S62 | 2.68 | 3.29 | 3.96 | | | |
| S63 | −4.36 | 1.18 | 3.04 | 1.92 | 18.90 | The Second Lens L62 |
| S64 | −7.67 | 0.06 | 3.00 | | | |
| S65 | 8.23 | 0.80 | 2.93 | 1.90 | 31.42 | The Third Lens L63 |
| S66 | −13.88 | 0.01 | 2.71 | | | |
| S67 | INF | 2.36 | 2.61 | | | Stop ST6 |
| S68 | 6.03 | 1.67 | 4.03 | 1.62 | 63.41 | The Fourth Lens L64 |
| S69 | −4.23 | 0.00 | 4.33 | | | |
| S610 | −4.23 | 0.50 | 4.33 | 1.92 | 20.88 | The Fifth Lens L65 |
| S611 | −31.73 | 0.18 | 4.90 | | | |
| S612 | 12.91 | 0.88 | 5.73 | 1.54 | 55.78 | The Sixth Lens L66 |
| S613 | −15.99 | 0.50 | 5.74 | | | |
| S614 | ∞ | 0.70 | 5.84 | 1.52 | 64.21 | Optical Filter OF6 |
| S615 | ∞ | 4.56 | 5.94 | | | |

In the sixth embodiment, the equation of the aspheric surface profiles of the aforementioned lens is the same as the equation of the fifth embodiment. Also, the definitions of these parameters shown in the following table 13 are the same as those stated in the fifth embodiment with corresponding values for the sixth embodiment, so an explanation in this regard will not be provided again.

TABLE 13

| Surface Number | k | A E | B F | C G | D |
|---|---|---|---|---|---|
| S612 | 1.82 | −4.61E−04 −2.97E−07 | 1.35E−04 0.00E+00 | −1.22E−05 0.00E+00 | 2.56E−06 |
| S613 | −82.55 | 1.26E−03 −8.71E−08 | 3.30E−04 0.00E+00 | −1.37E−05 0.00E+00 | 2.20E−07 |

Table 14 shows the parameters and condition values for conditions (13)-(18) in accordance with the sixth embodiment of the invention. It can be seen from Table 14 that the lens assembly 6 of the sixth embodiment satisfies the conditions (13)-(18).

TABLE 14

| f | 3.39 mm | $f_1$ | −4.43 mm | $f_2$ | −13.09 mm |
|---|---|---|---|---|---|
| $f_6$ | 13.46 mm | $f_{12}$ | −2.93 mm | $f_{3456}$ | 4.64 mm |
| TTL | 17.2 mm | $D_1$ | 6.77 mm | | |
| $f_1/f$ | −1.30 | $f_2/f$ | −3.86 | $f_{12}/f$ | −0.86 |
| $f_6/f$ | 3.96 | $f_{12}/f_{3456}$ | −0.63 | $TTL/D_1$ | 2.54 |

Figure 9A:
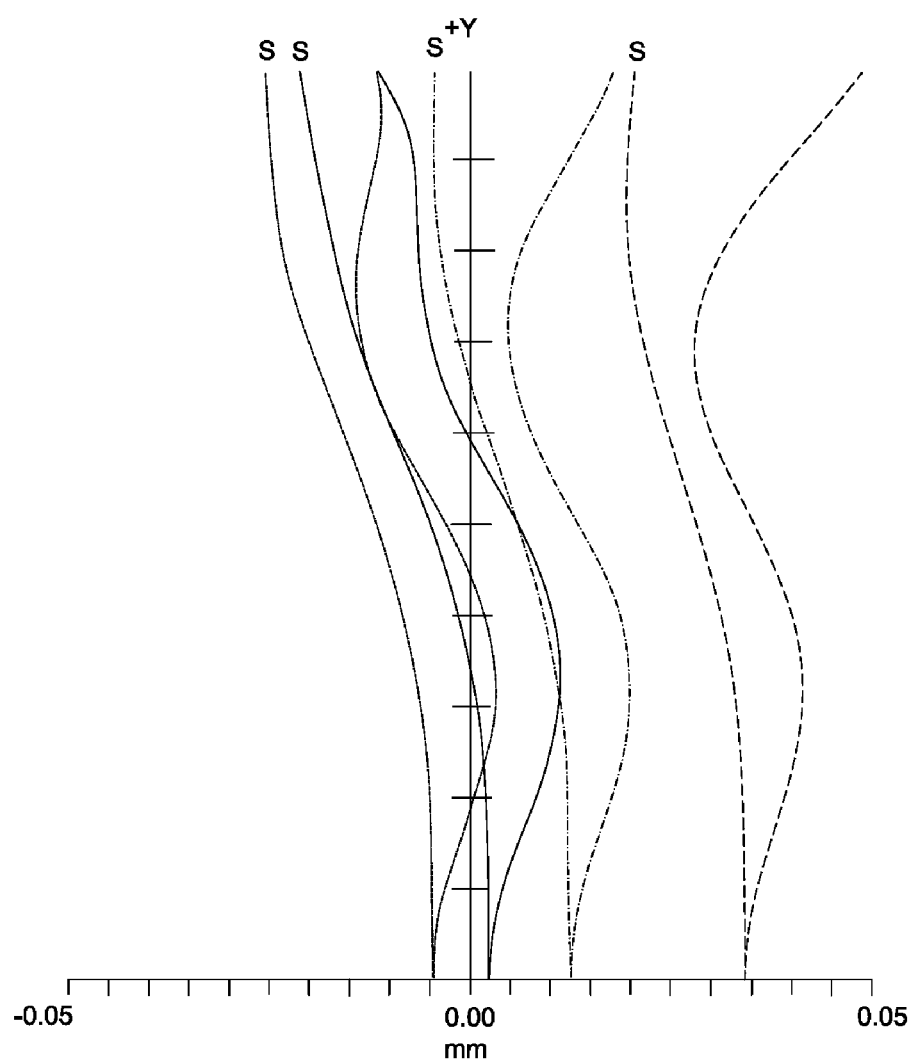
FIG. 9A depicts a field curvature diagram of the lens assembly in accordance with the sixth embodiment of the invention.

It can be seen from FIG. 9A that the field curvature of tangential direction and sagittal direction in the lens assembly 6 of the sixth embodiment ranges from −0.03 mm to 0.05 mm for the wavelength of 470 nm, 510 nm, 610 nm, and 850 nm.

It can be seen from FIG. 9B that the distortion in the lens assembly 6 of the sixth embodiment ranges from −85% to 0% for the wavelength of 470 nm, 510 nm, 610 nm, and 850 nm.

Figure 9C:
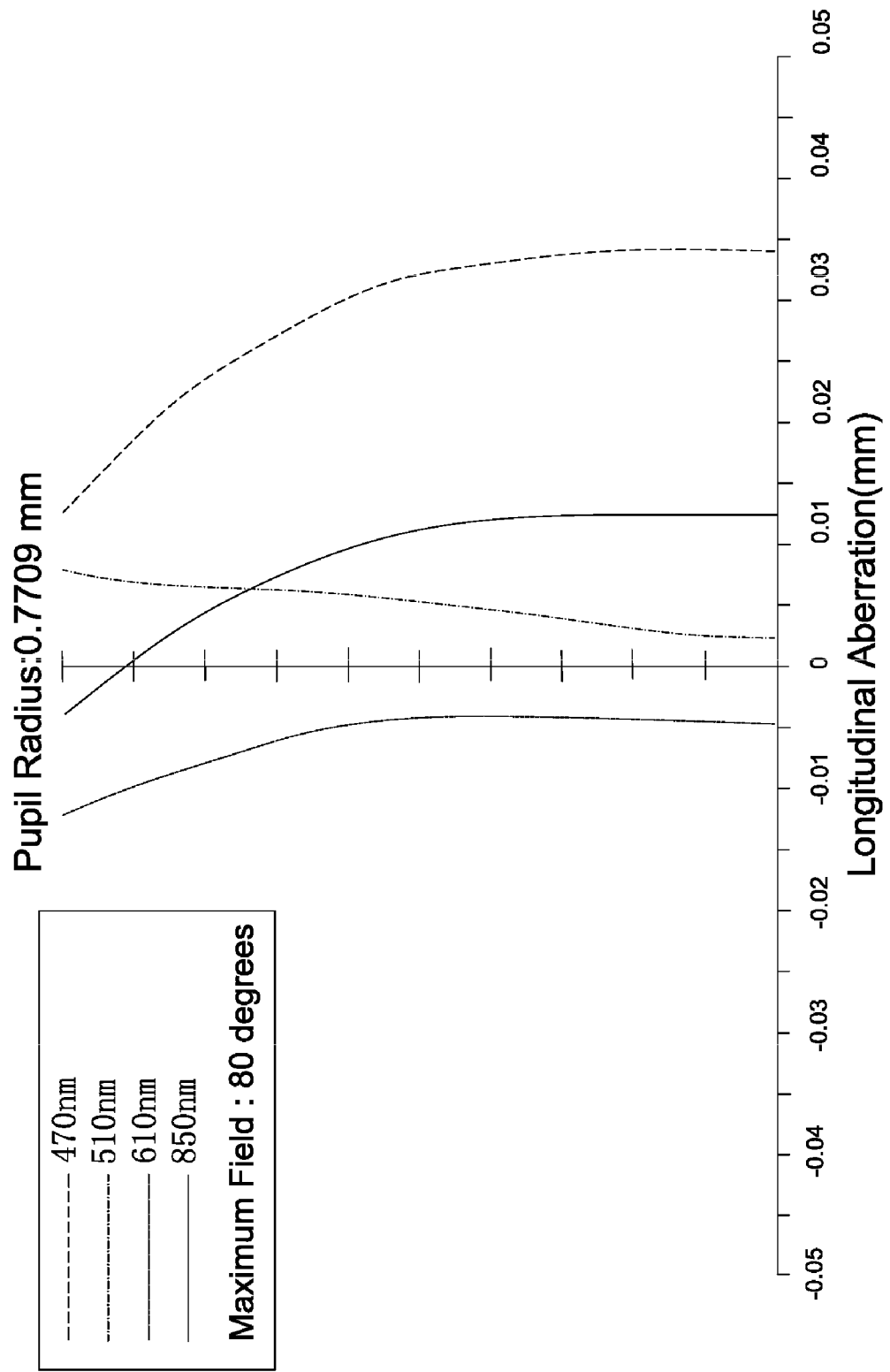
FIG. 9C is a longitudinal aberration diagram of the lens assembly in accordance with the sixth embodiment of the invention.

It can be seen from FIG. 9C that the longitudinal aberration in the lens assembly 6 of the sixth embodiment ranges from −0.015 mm to 0.035 mm for the wavelength of 470 nm, 510 nm, 610 nm and 850 nm.

It is obvious that the field curvature, distortion, and the longitudinal aberration of the lens assembly 6 of the sixth embodiment can be corrected effectively. Therefore, the lens assembly 6 of the sixth embodiment is capable of good optical performance.

The main conditions for the present invention are $-1.5<f_1/f<-0.8$ and $-4.5<f_2/f<-3.5$. The condition values of the embodiments for the present invention also fall within the range of the remaining conditions. The conditions: $-1.5<f_1/f<-0.8$ and $-4.5<f_2/f<-3.5$ can support strong enough refractive power.

Referring to FIGS. 1-9C and Tables 1-14, to thereby enable others skilled in the art to best utilize the disclosure and various embodiments with various modifications as are suited to the particular use contemplated. According to the present disclosure, a lens assembly provided in the disclosure includes, in order from an object side to an image side, a first lens, a second lens, a third lens, a fourth lens, a fifth lens and a sixth lens. The first lens is with negative refractive power, the second lens is with negative refractive power, the third lens is with positive refractive power, the fourth lens is with positive refractive power, the fifth lens is with negative refractive power, and the sixth lens is with positive refractive power, wherein the lens assembly satisfies: $4.9 \leq TTL/f \leq 11.5$ or $-4 < f_1/f < -0.8$. The condition: $4.9 \leq TTL/f \leq 11.5$ benefits to achieve miniaturization. The condition: $-4 < f_1/f < -0.8$ can support strong enough refractive power.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly comprising:
   a first lens which is with negative refractive power;
   a second lens which is with negative refractive power and comprises a concave surface facing an object side;
   a third lens which is with positive refractive power;
   a fourth lens which is with positive refractive power;
   a fifth lens which is with negative refractive power; and
   a sixth lens which is with positive refractive power and comprises a convex surface facing an image side;
   wherein the first lens, the second lens, the third lens, the fourth lens, the fifth lens, and the sixth lens are arranged in order from an object side to an image side along an optical axis;
   wherein the lens assembly satisfies:

$4.9 \leq TTL/f \leq 11.5$;

$3.79 \leq f_6/f \leq 4.51$;

wherein TTL is an interval from an object side surface of the first lens to an image plane along the optical axis, $f_6$ is an effective focal length of the sixth lens, and f is an effective focal length of the lens assembly.

2. The lens assembly as claimed in claim 1 wherein:
   the lens assembly further comprises a stop disposed between the third lens and the fourth lens; and
   the fourth lens and the fifth lens are cemented.

3. The lens assembly as claimed in claim 1, wherein:
   the third lens comprises a convex surface facing the object side and another convex surface facing the image side;
   the fourth lens comprises a convex surface facing the object side and another convex surface facing the image side;
   the fifth lens comprises a convex surface facing the image side; and
   the sixth lens comprises a convex surface facing the object side;
   wherein the lens assembly satisfies:

$0.12 \leq TTL/\theta_m \leq 0.37$;

$30 \leq Vd_4 - Vd_5 \leq 50$;

$-4 \leq f_2/f \leq -2$;

$-3 \leq f_1/R_{12} \leq -0.5$;

wherein TTL is an interval in mm from an object side surface of the first lens to an image plane along the optical axis, $\theta_m$ is a half maximum field of view in degree for the lens assembly, $Vd_4$ is an Abbe number of the fourth lens, $Vd_5$ is an Abbe number of the fifth lens, f is an effective focal length of the lens assembly, $f_2$ is an effective focal length of the second lens, $f_1$ is an effective focal length of the first lens, and $R_{12}$ is a radius of curvature of an image side surface of the first lens.

4. The lens assembly as claimed in claim 1, wherein the lens assembly satisfies:

$2 \leq TTL/D_1 \leq 3.3$;

wherein TTL is an interval in mm from an object side surface of the first lens to an image plane along the optical axis and $D_1$ is an effective diameter in mm for the first lens.

5. The lens assembly as claimed in claim 1, wherein the lens assembly satisfies:

$1.8 \leq RS_{11}/f \leq 9.9$;

wherein f is an effective focal length of the lens assembly and $RS_{11}$ is an effective radius of the first lens.

6. The lens assembly as claimed in claim 1, wherein:
   the first lens comprises a convex surface facing the object side and a concave surface facing the image side; and
   the fifth lens comprises a concave surface facing the object side.

7. The lens assembly as claimed in claim 1, wherein the lens assembly satisfies:

$-1.5 \leq f_{12}/f \leq 0.8$;

$-1 \leq f_{12}/f_{3456} \leq -0.3$;

wherein f is an effective focal length of the lens assembly, $f_{12}$ is an effective focal length of a combination of the first lens and the second lens, and $f_{3456}$ is an effective focal length of a combination of the third lens, the fourth lens, the fifth lens, and the sixth lens.

8. A lens assembly comprising:
a first lens which is with negative refractive power;
a second lens which is with negative refractive power;
a third lens which is with positive refractive power;
a fourth lens which is with positive refractive power;
a fifth lens which is with negative refractive power; and
a sixth lens which is with positive refractive power;
wherein the first lens, the second lens, the third lens, the fourth lens, the fifth lens, and the sixth lens are arranged in order from an object side to an image side along an optical axis;
wherein the lens assembly satisfies:

$8.44 \leq TTL/f \leq 8.76$;

$3.79 \leq f_6/f \leq 4.15$;

wherein TTL is an interval from an object side surface of the first lens to an image plane along the optical axis, $f_6$ is an effective focal length of the sixth lens, and f is an effective focal length of the lens assembly.

* * * * *